(12) United States Patent
Ogasawara et al.

(10) Patent No.: US 10,455,273 B2
(45) Date of Patent: Oct. 22, 2019

(54) SIGNAL PROCESSING DEVICE, SIGNAL PROCESSING METHOD, AND IMAGE TRANSMISSION SYSTEM

(71) Applicant: SONY CORPORATION, Tokyo (JP)

(72) Inventors: Koichi Ogasawara, Tokyo (JP); Masayuki Imanishi, Tokyo (JP); Atsushi Maruyama, Tokyo (JP); Seishi Tomonaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 447 days.

(21) Appl. No.: 14/895,177

(22) PCT Filed: May 28, 2014

(86) PCT No.: PCT/JP2014/002834
§ 371 (c)(1),
(2) Date: Dec. 1, 2015

(87) PCT Pub. No.: WO2014/196170
PCT Pub. Date: Dec. 11, 2014

(65) Prior Publication Data
US 2016/0105709 A1   Apr. 14, 2016

(30) Foreign Application Priority Data
Jun. 7, 2013  (JP) .................................. 2013-120597

(51) Int. Cl.
*H04N 21/431*  (2011.01)
*H04N 21/43*   (2011.01)
(Continued)

(52) U.S. Cl.
CPC ....... *H04N 21/4312* (2013.01); *H04N 21/242* (2013.01); *H04N 21/2402* (2013.01);
(Continued)

(58) Field of Classification Search
CPC .......... H04N 21/4312; H04N 21/4302; H04N 21/242; H04N 21/2402; H04N 21/64761;
(Continued)

(56) References Cited

U.S. PATENT DOCUMENTS

| 8,233,056 B2 | 7/2012 | Harada et al. |
| 2005/0174482 A1 | 8/2005 | Yamada et al. |
| 2006/0238648 A1 | 10/2006 | Wogsberg |
| 2007/0033289 A1* | 2/2007 | Nuyttens ................ H04N 7/181 709/230 |

(Continued)

FOREIGN PATENT DOCUMENTS

WO    2007/137209 A2   11/2007

*Primary Examiner* — David Tung
(74) *Attorney, Agent, or Firm* — Chip Law Group

(57) ABSTRACT

Provided is a signal processing device including a control information acquiring unit configured to acquire image control information regarding control of an image, an image receiver configured to selectively receive one or more images transmitted using multicast based on the image control information, one or more image processing units configured to perform an image process on an image received by the image receiver based on the image control information, and an image sender configured to transmit an image subjected to the image process by the image processing unit based on the image control information, the image being transmitted using multicast.

27 Claims, 26 Drawing Sheets

(51) Int. Cl.
  *H04N 21/242*    (2011.01)
  *H04N 21/24*     (2011.01)
  *H04N 21/647*    (2011.01)
  *H04N 21/41*     (2011.01)
  *H04N 21/643*    (2011.01)
  *H04N 21/6405*   (2011.01)

(52) U.S. Cl.
  CPC ..... *H04N 21/4122* (2013.01); *H04N 21/4302* (2013.01); *H04N 21/4314* (2013.01); *H04N 21/6405* (2013.01); *H04N 21/64322* (2013.01); *H04N 21/64738* (2013.01); *H04N 21/64753* (2013.01); *H04N 21/64761* (2013.01)

(58) Field of Classification Search
  CPC ......... H04N 21/4122; H04N 21/64738; H04N 21/64322; H04N 21/6405; H04N 21/4314; H04N 21/64753
  See application file for complete search history.

(56) References Cited

U.S. PATENT DOCUMENTS

| | | |
|---|---|---|
| 2009/0237560 A1 | 9/2009 | Ganzaroli et al. |
| 2012/0302343 A1* | 11/2012 | Hurst ................. H04N 21/4325 463/31 |
| 2013/0246576 A1* | 9/2013 | Wogsberg .............. H04N 7/181 709/219 |

\* cited by examiner

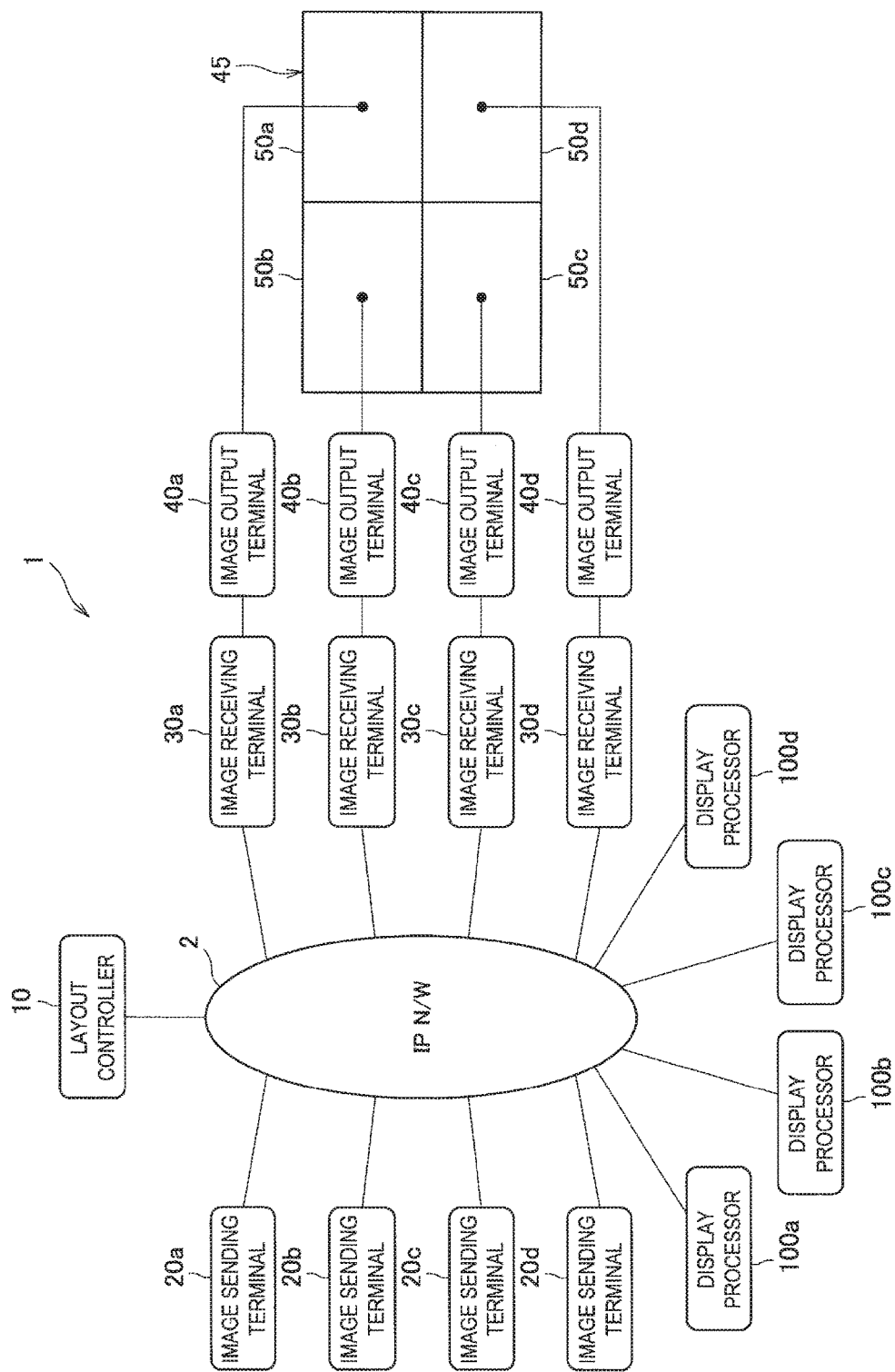
[Fig. 1]

[Fig. 2A]
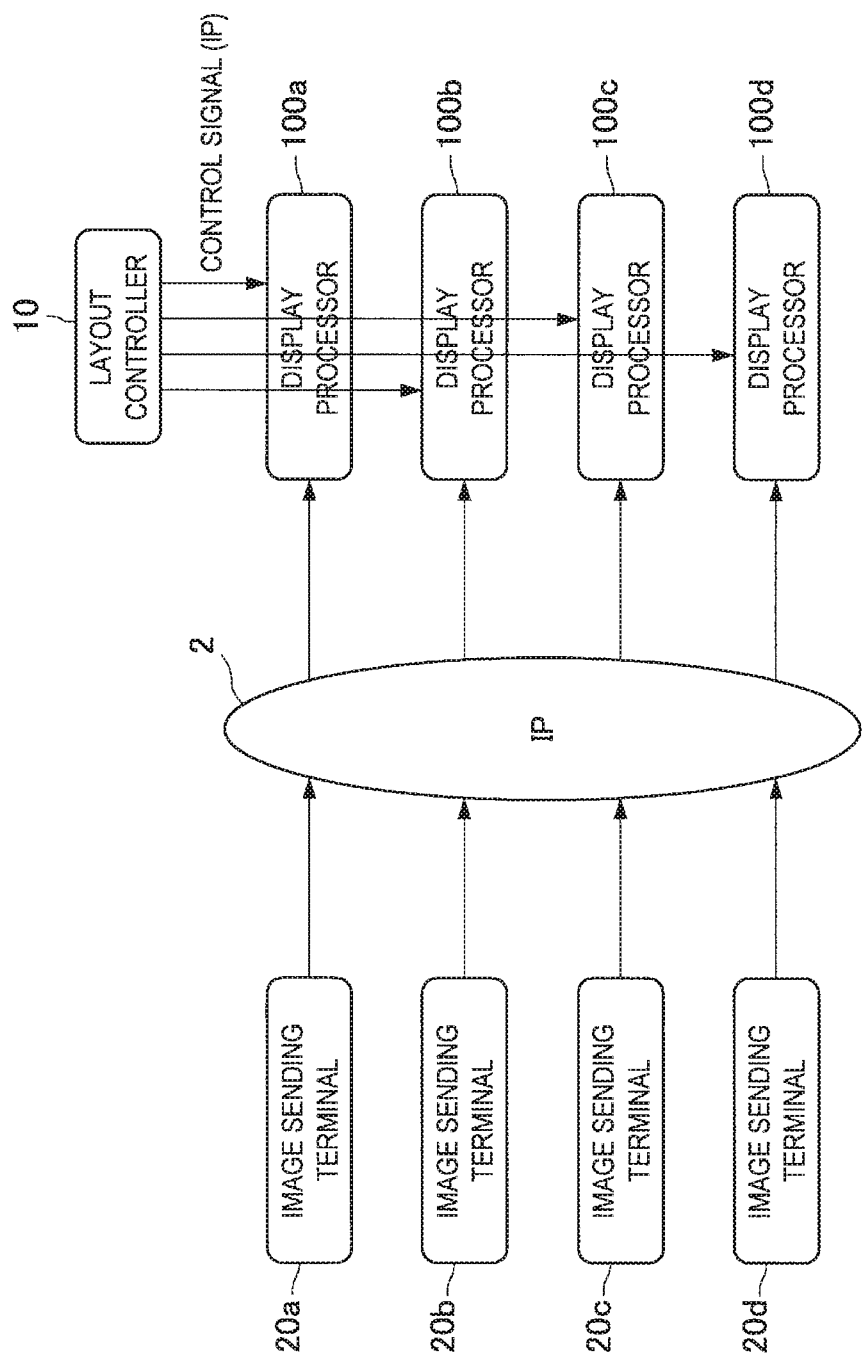

[Fig. 2B]
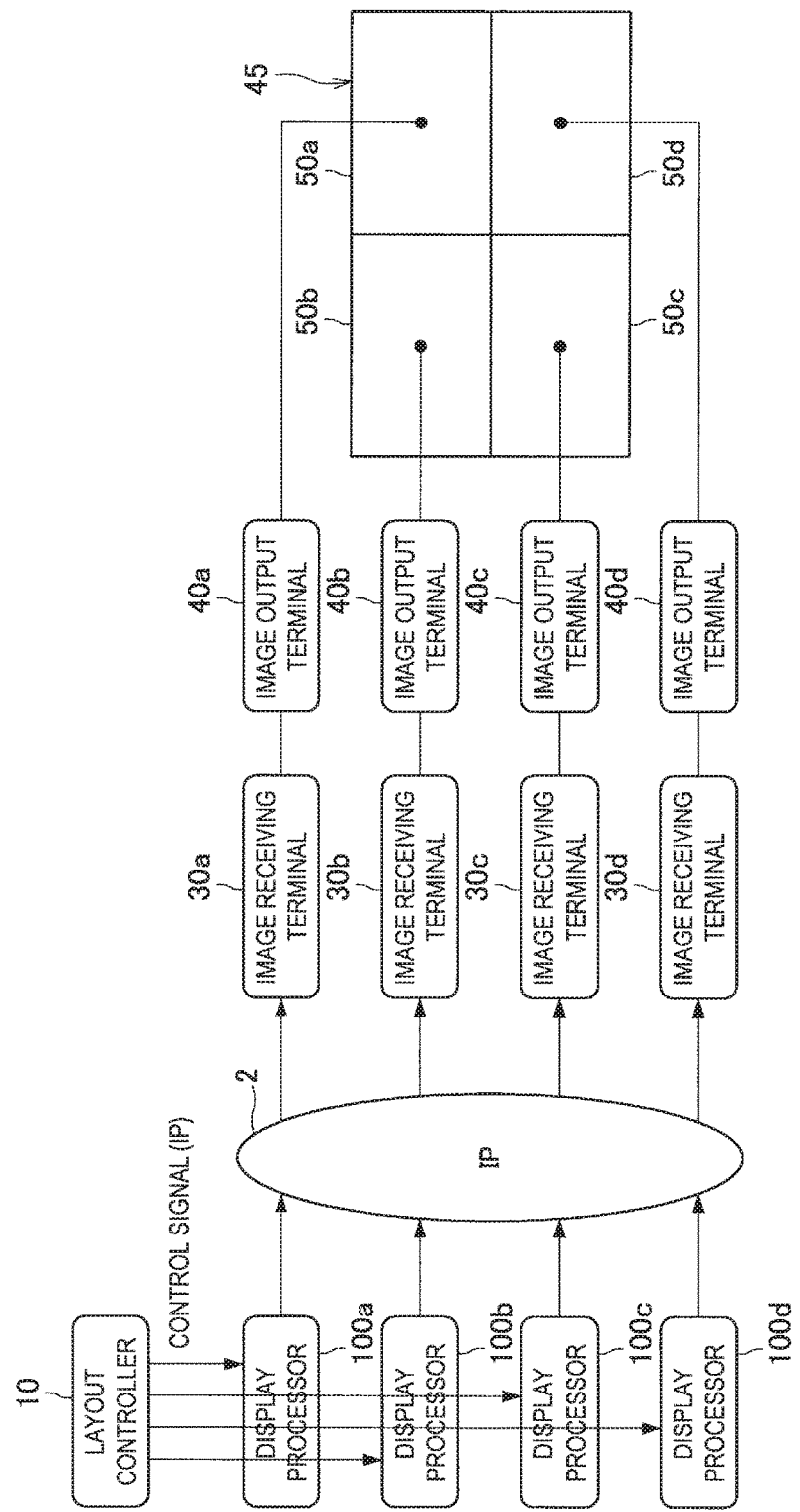

[Fig. 3]
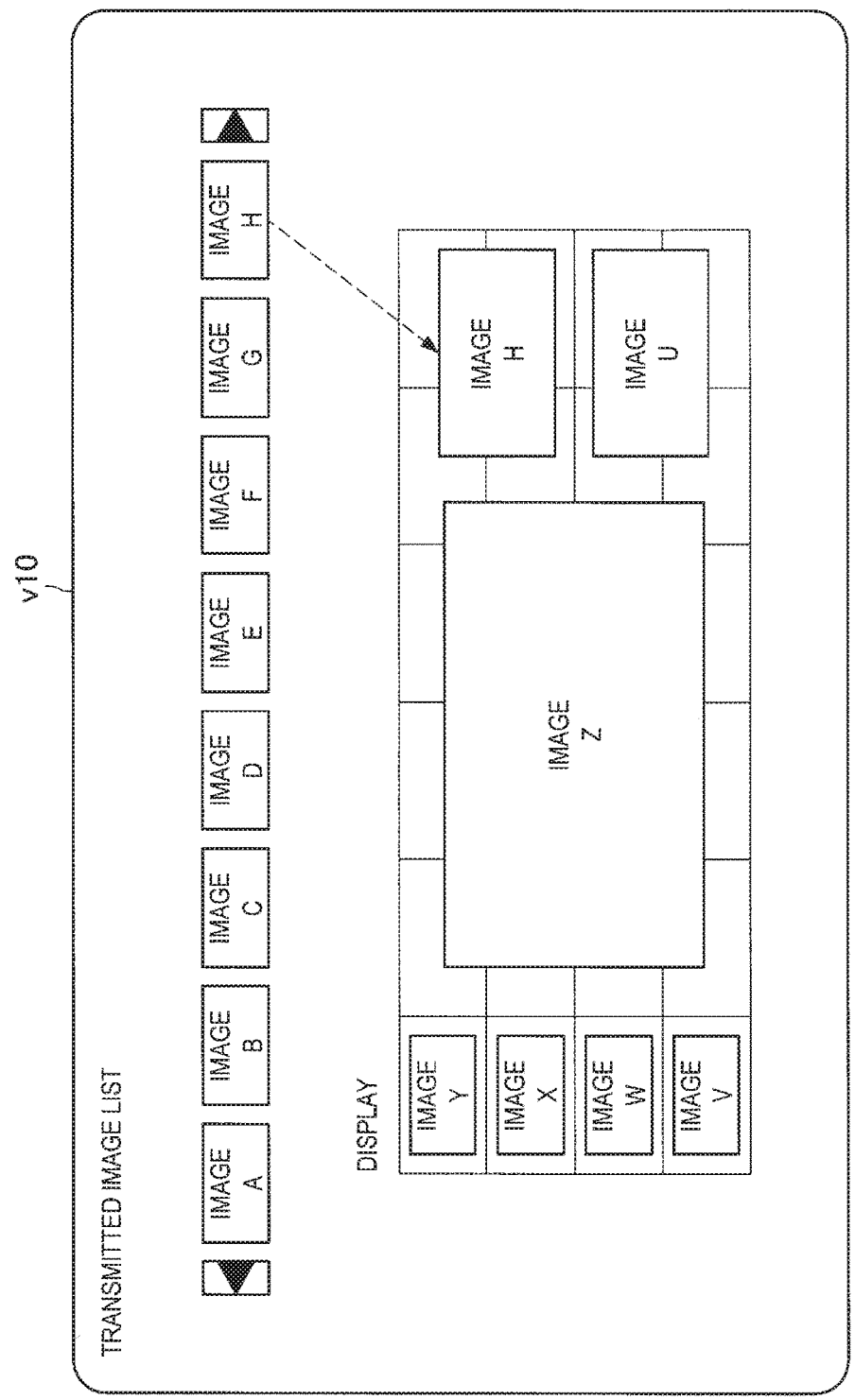

[Fig. 4]
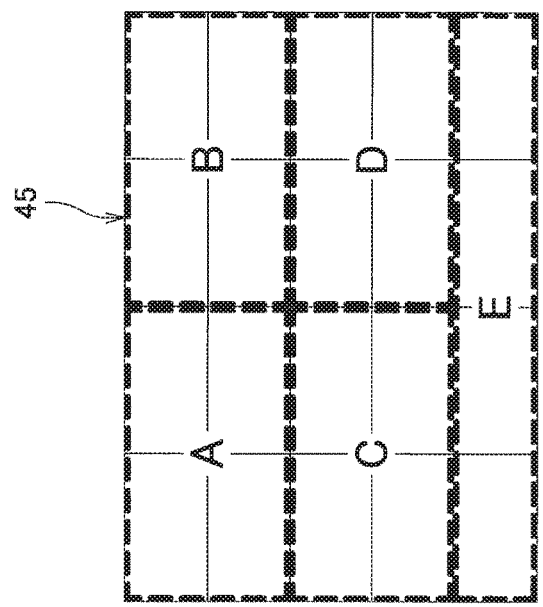
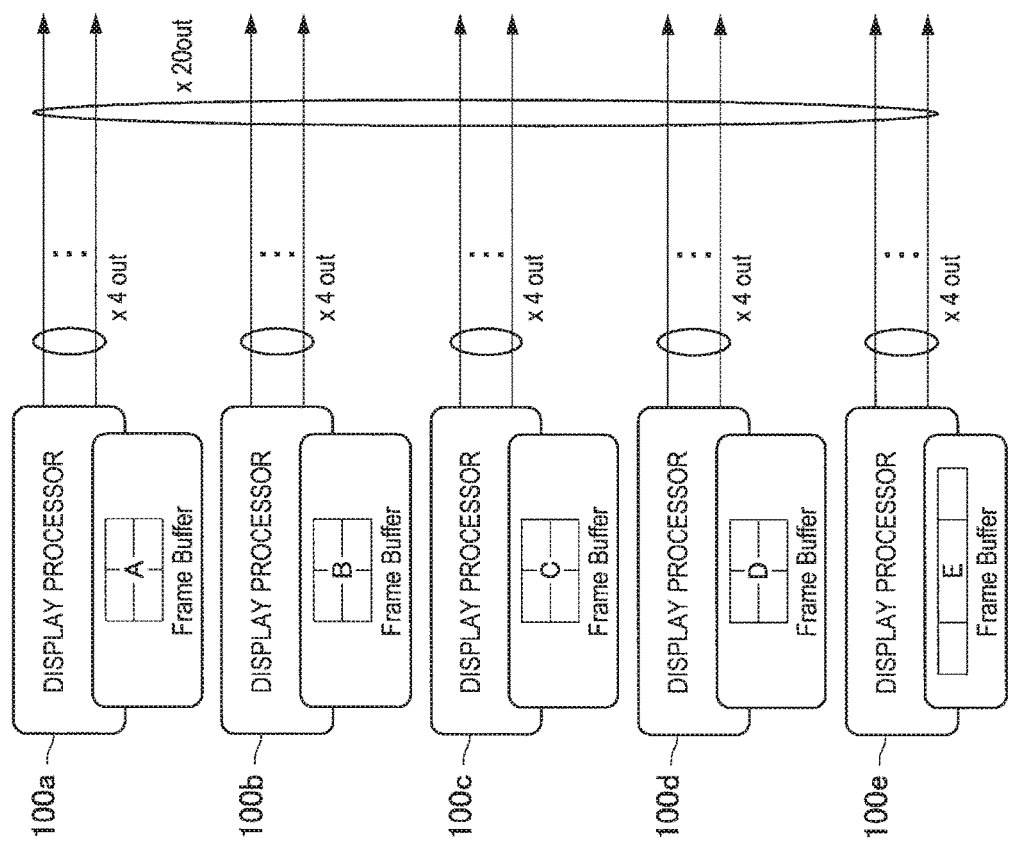

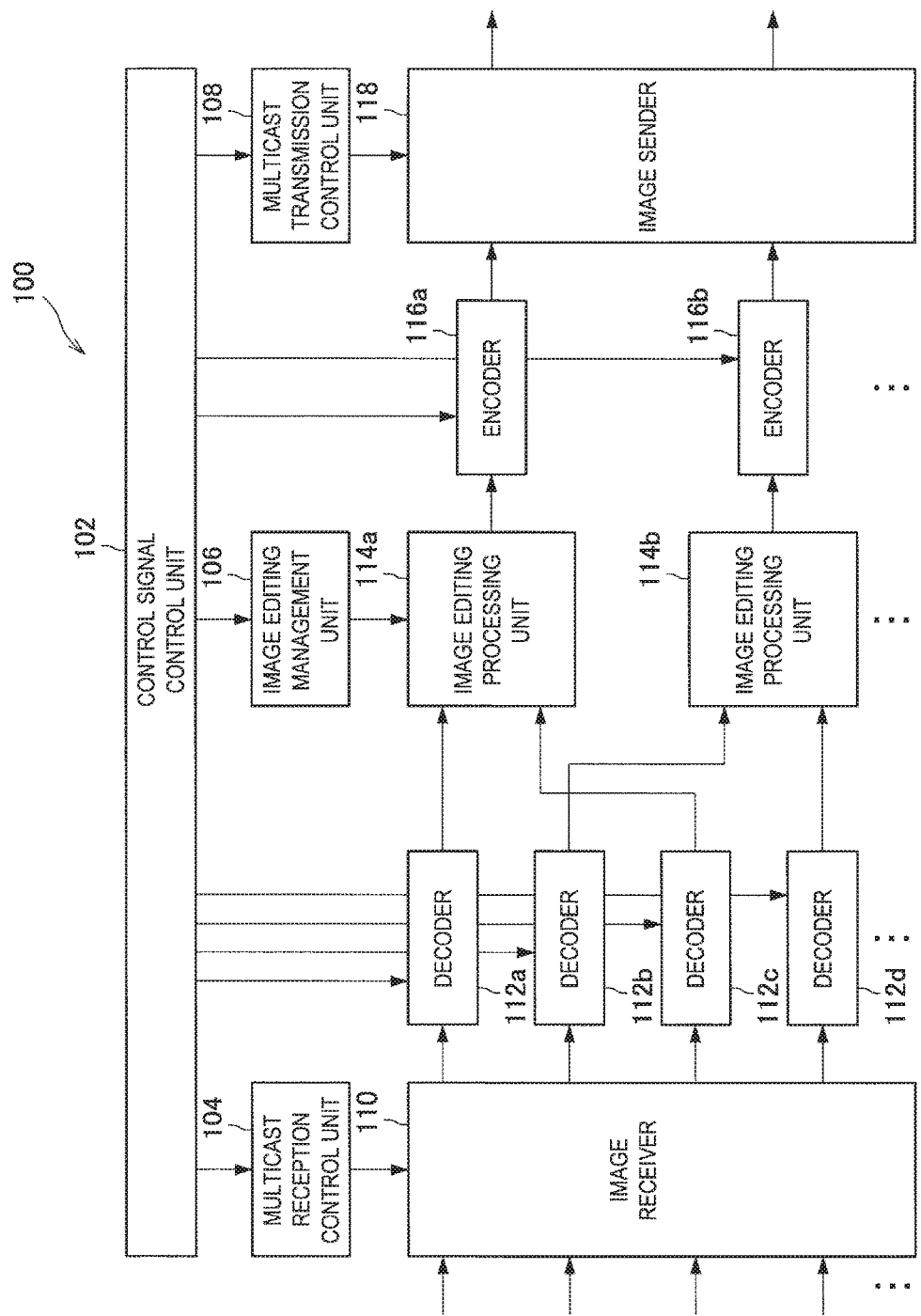
[Fig. 5]

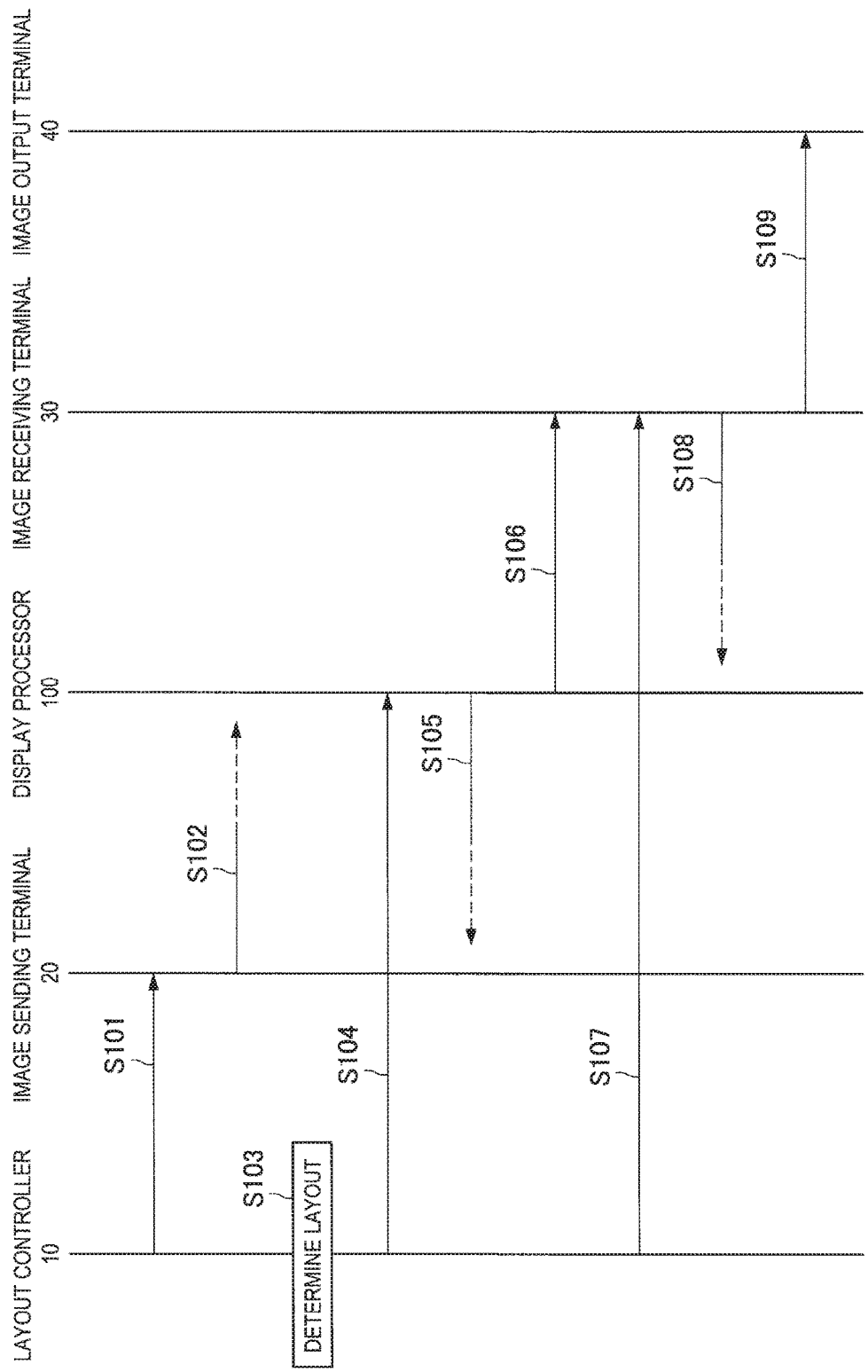
[Fig. 6]

[Fig. 7]
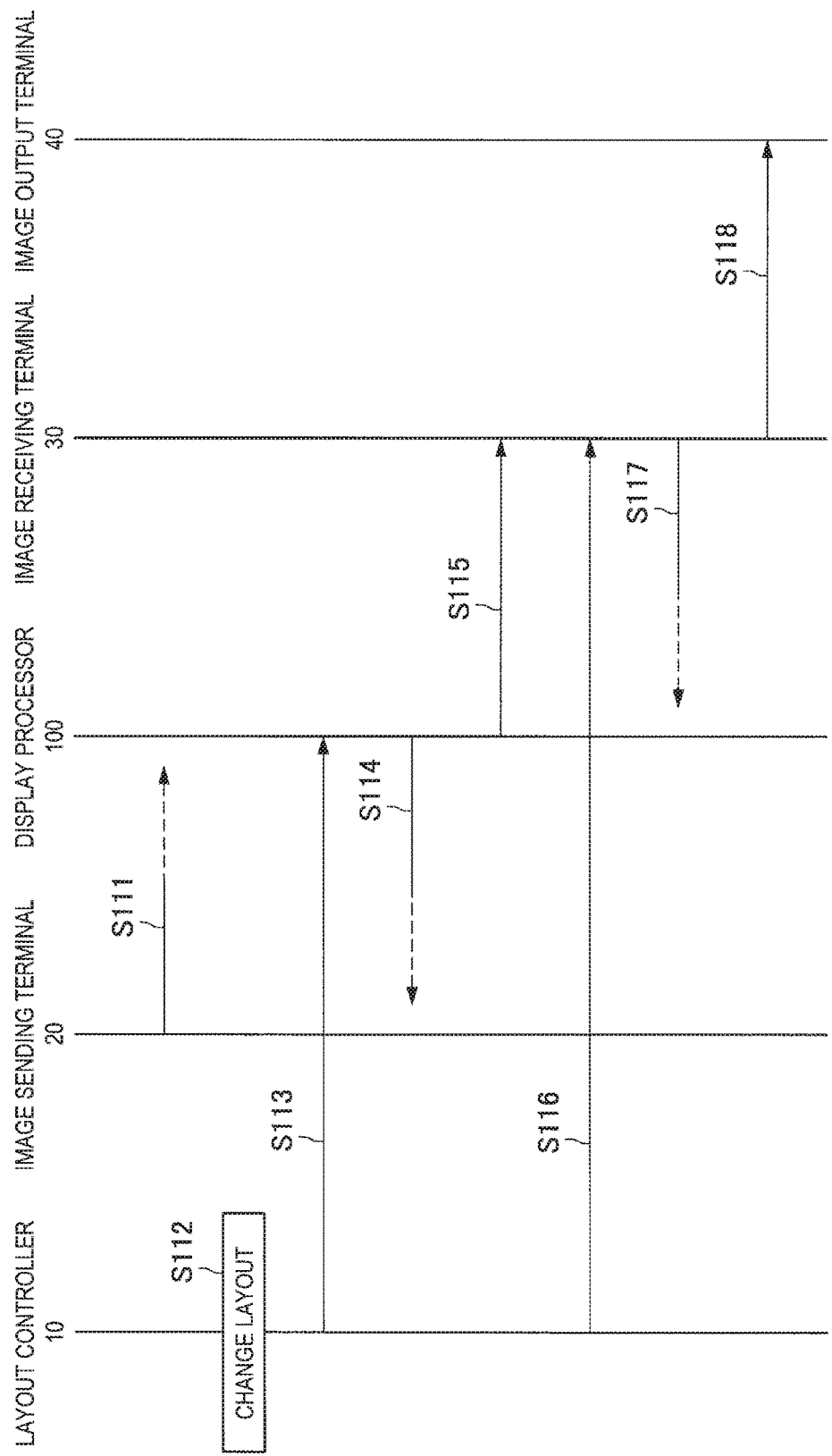

[Fig. 8]
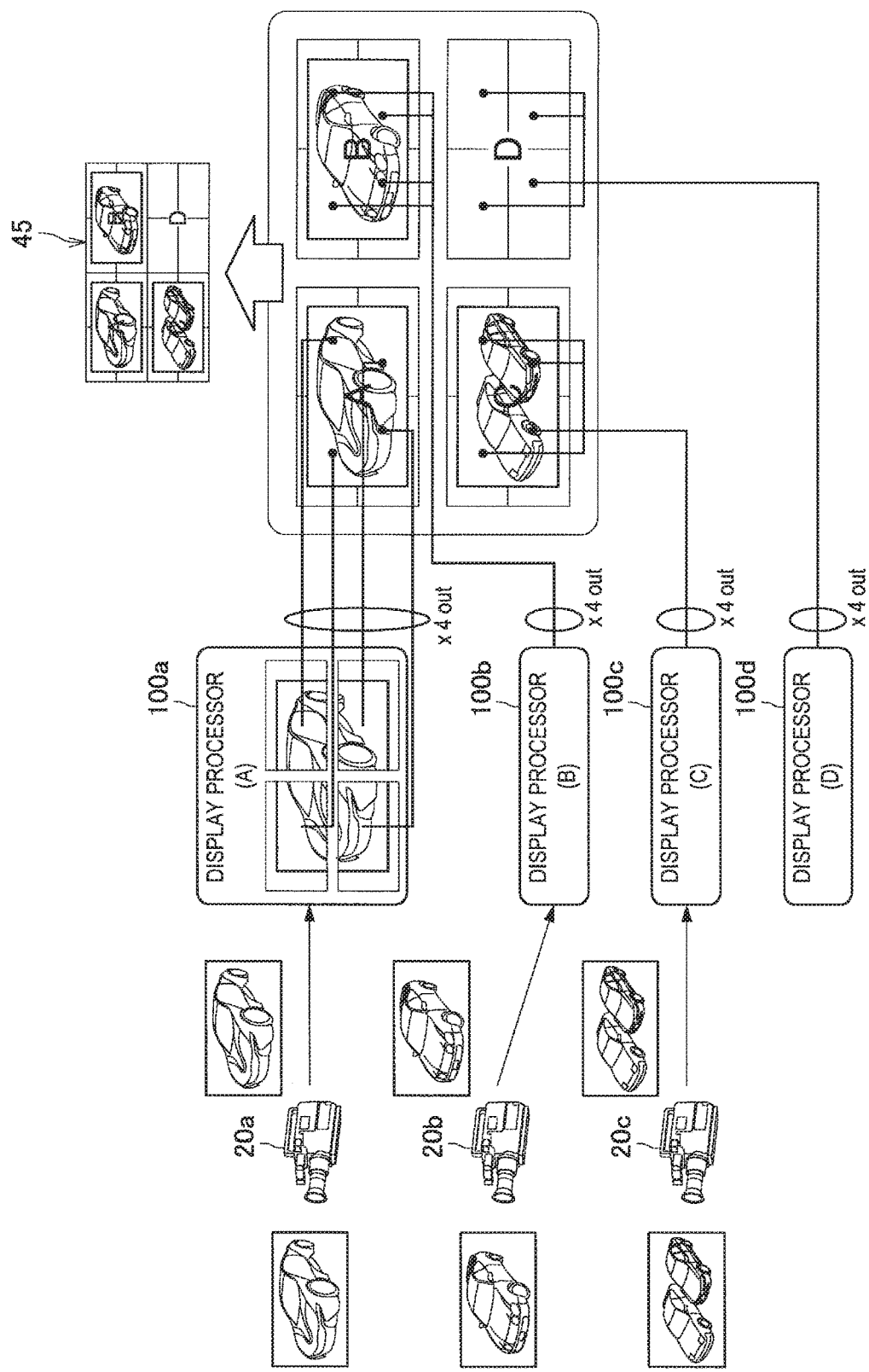

[Fig. 9]
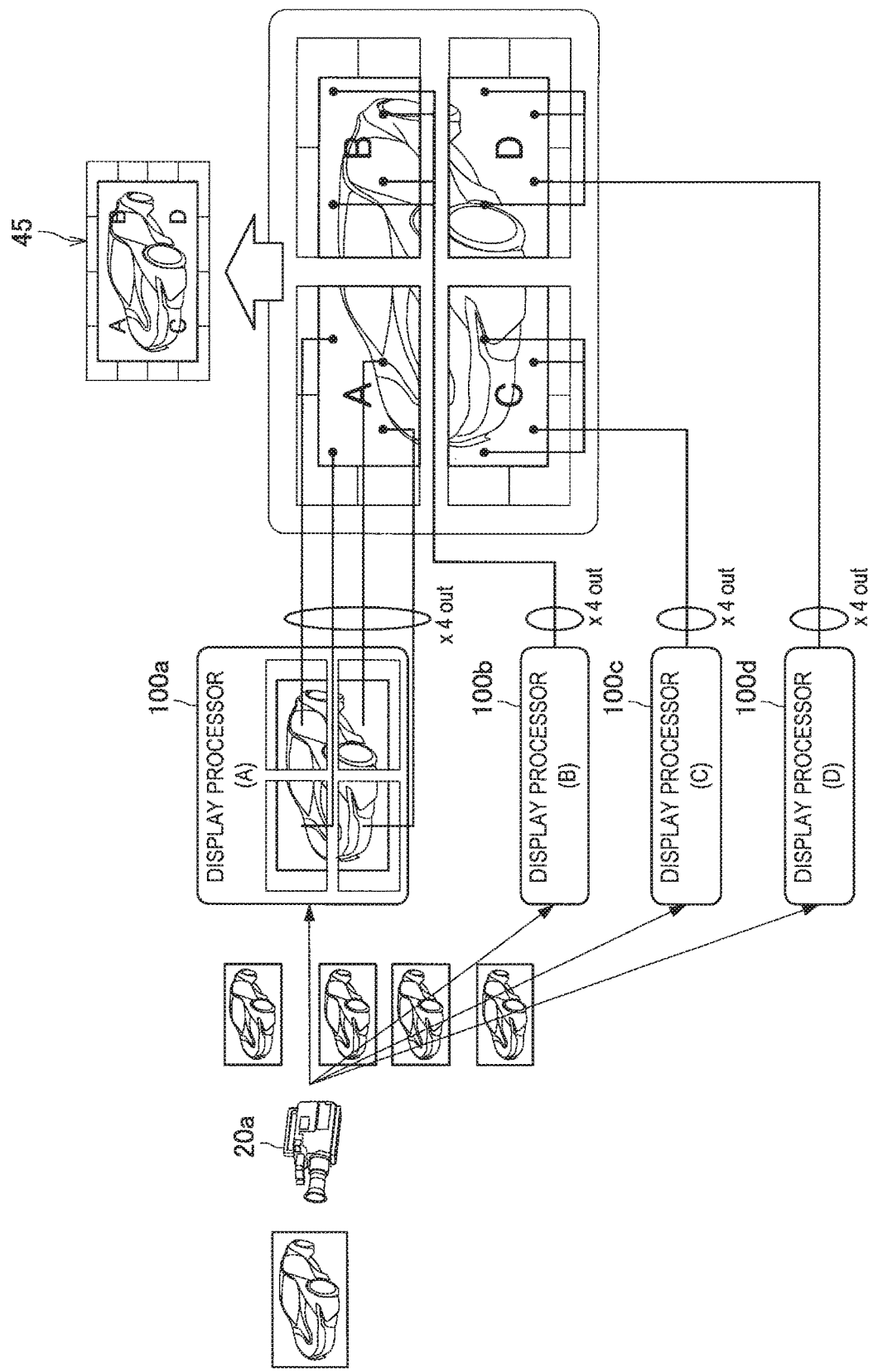

[Fig. 10]
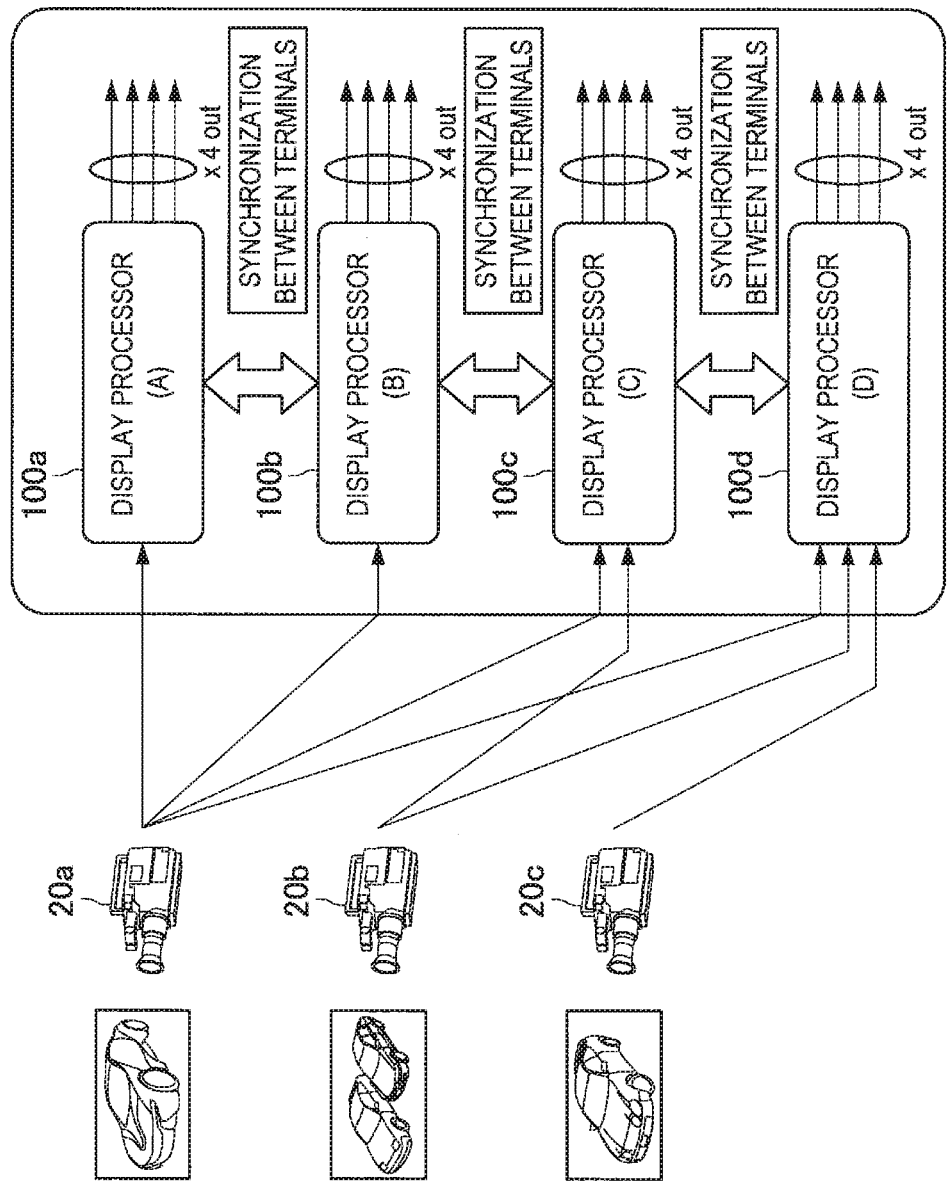

[Fig. 11]
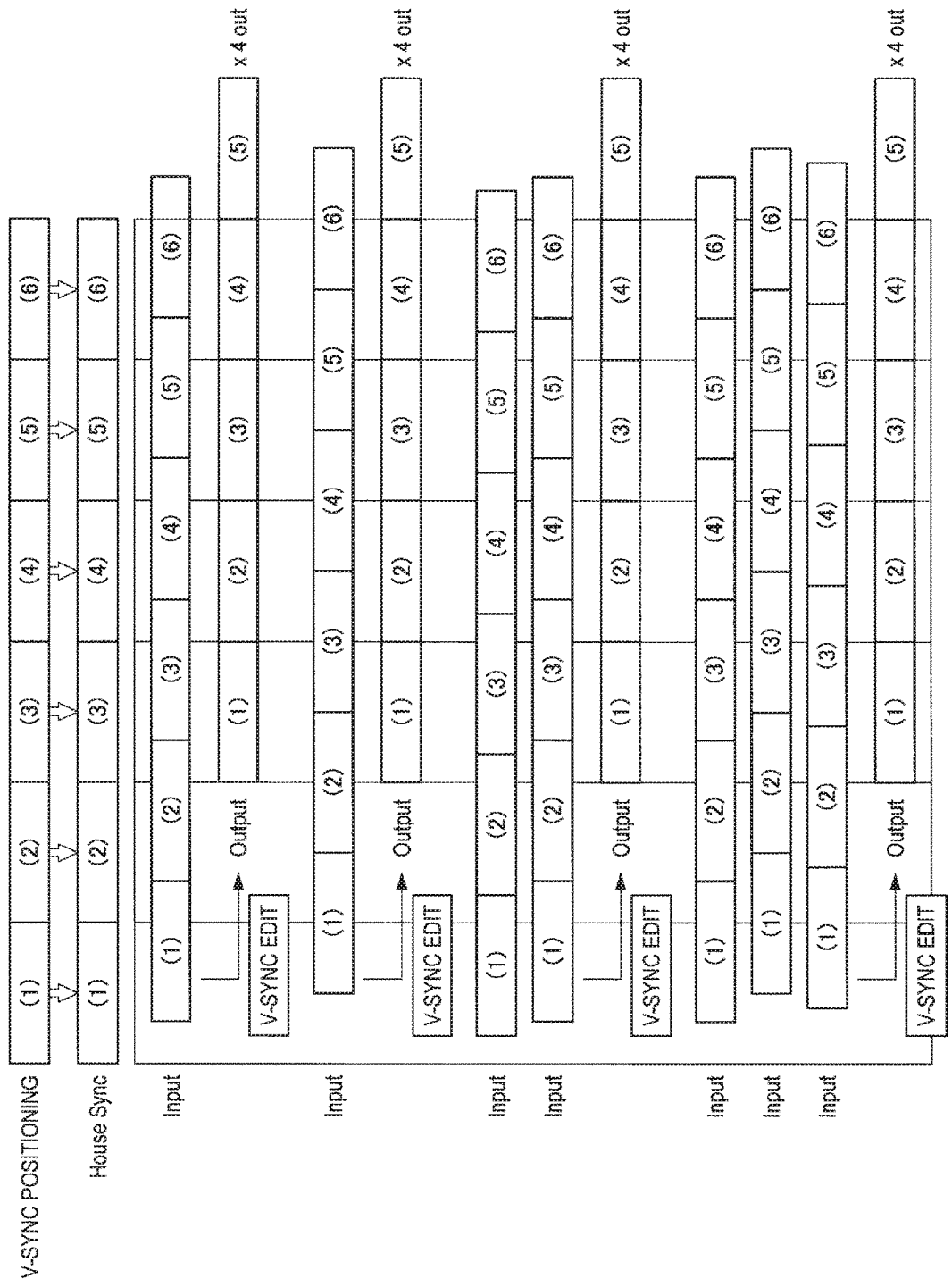

[Fig. 12]
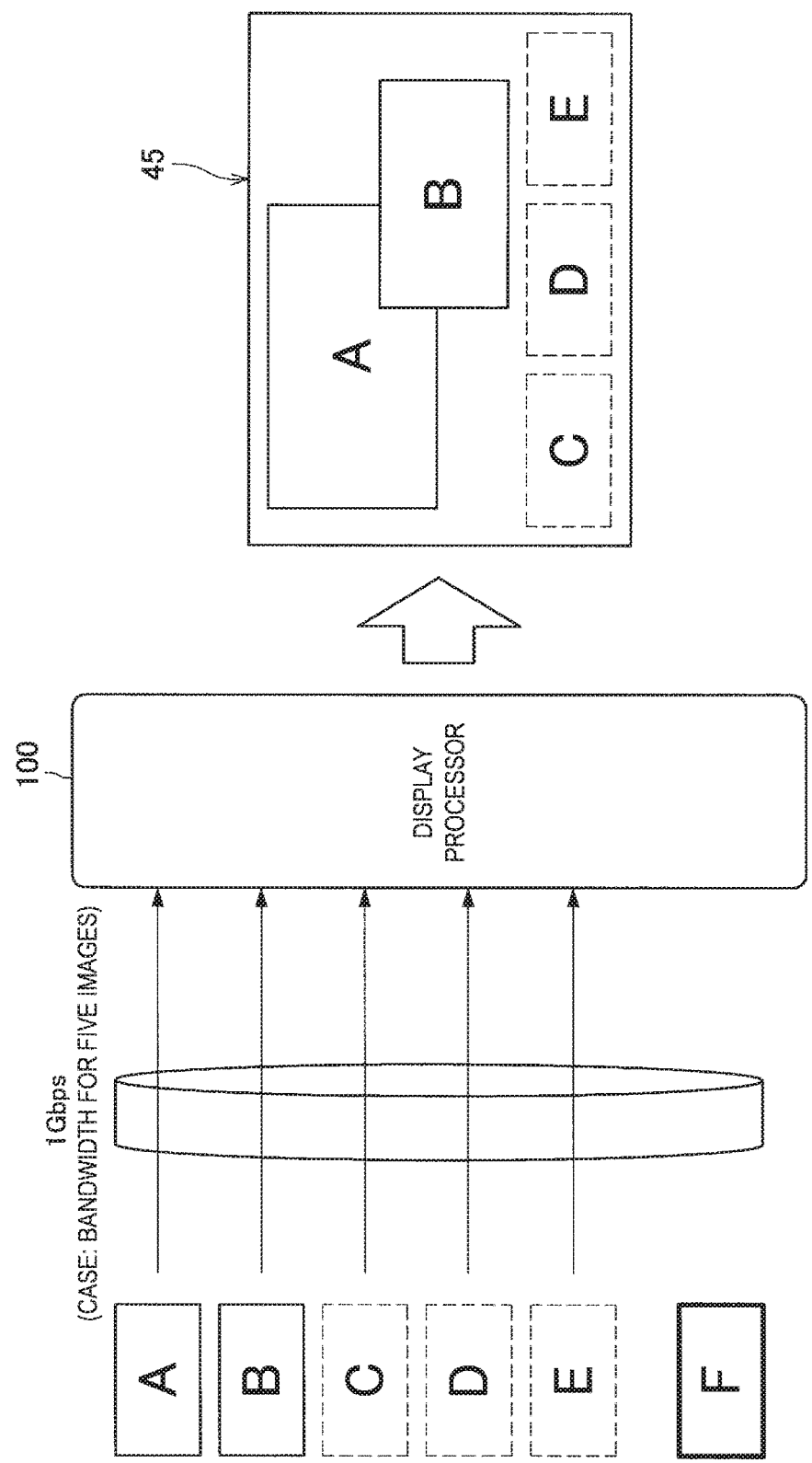

[Fig. 13]
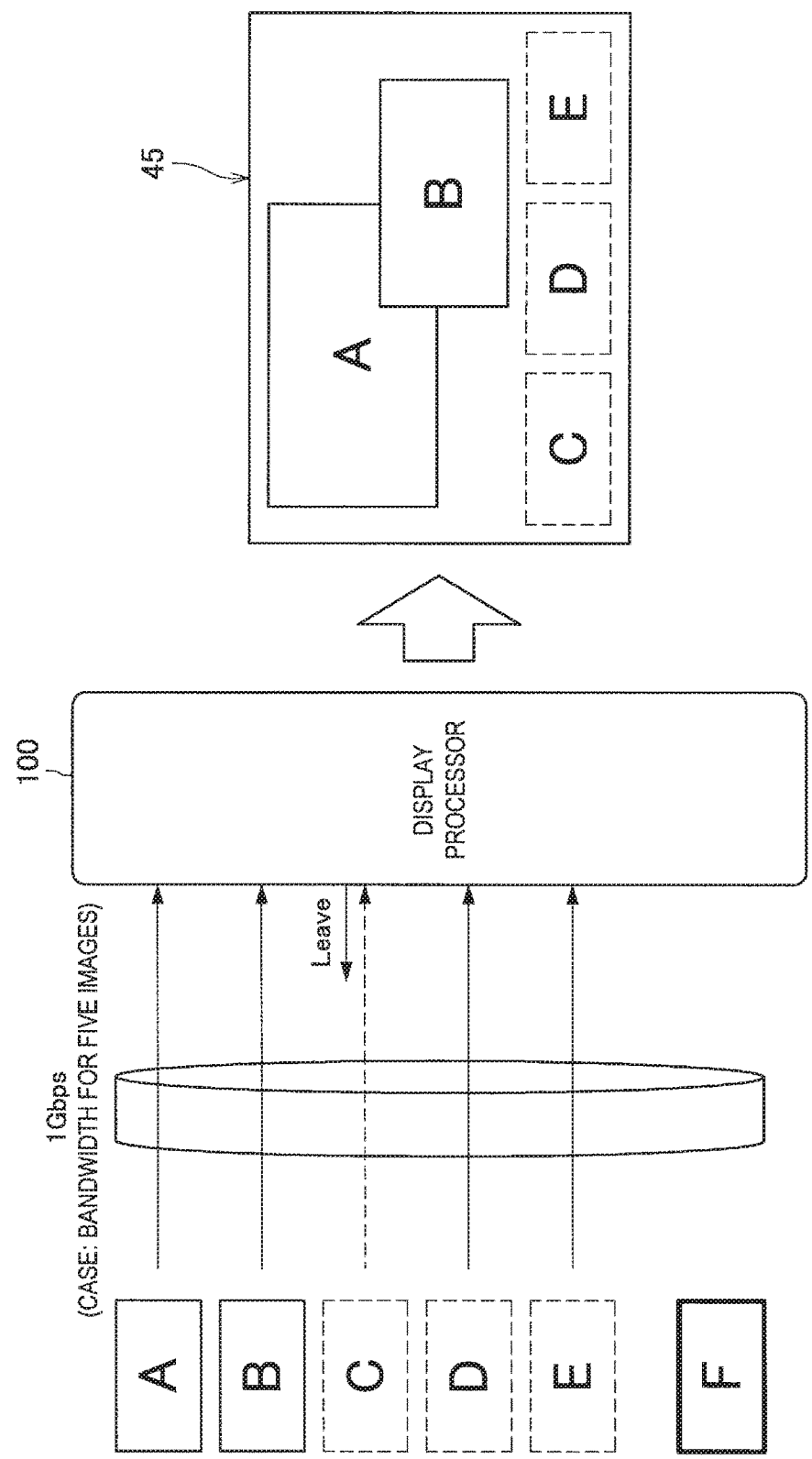

[Fig. 14]
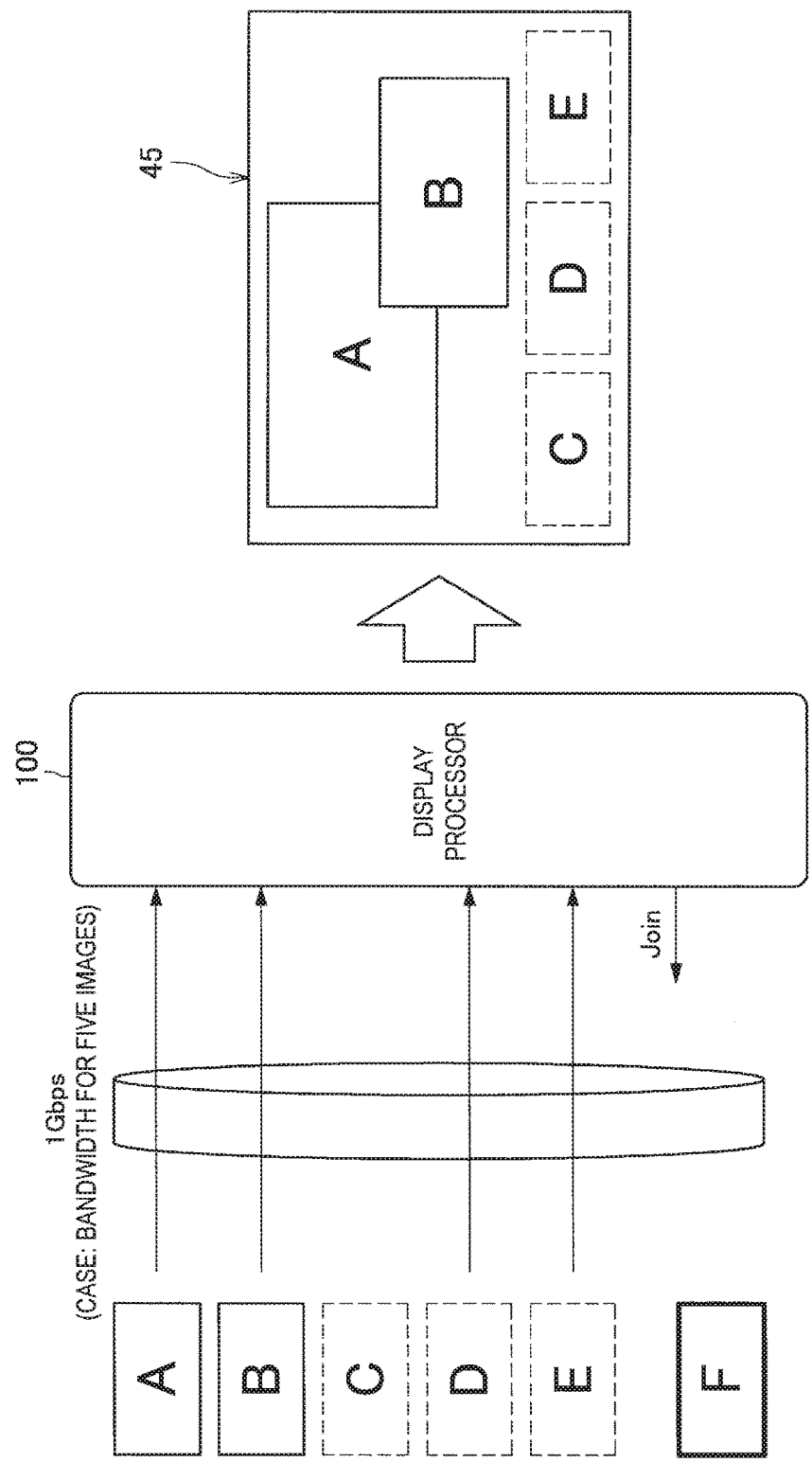

[Fig. 15]
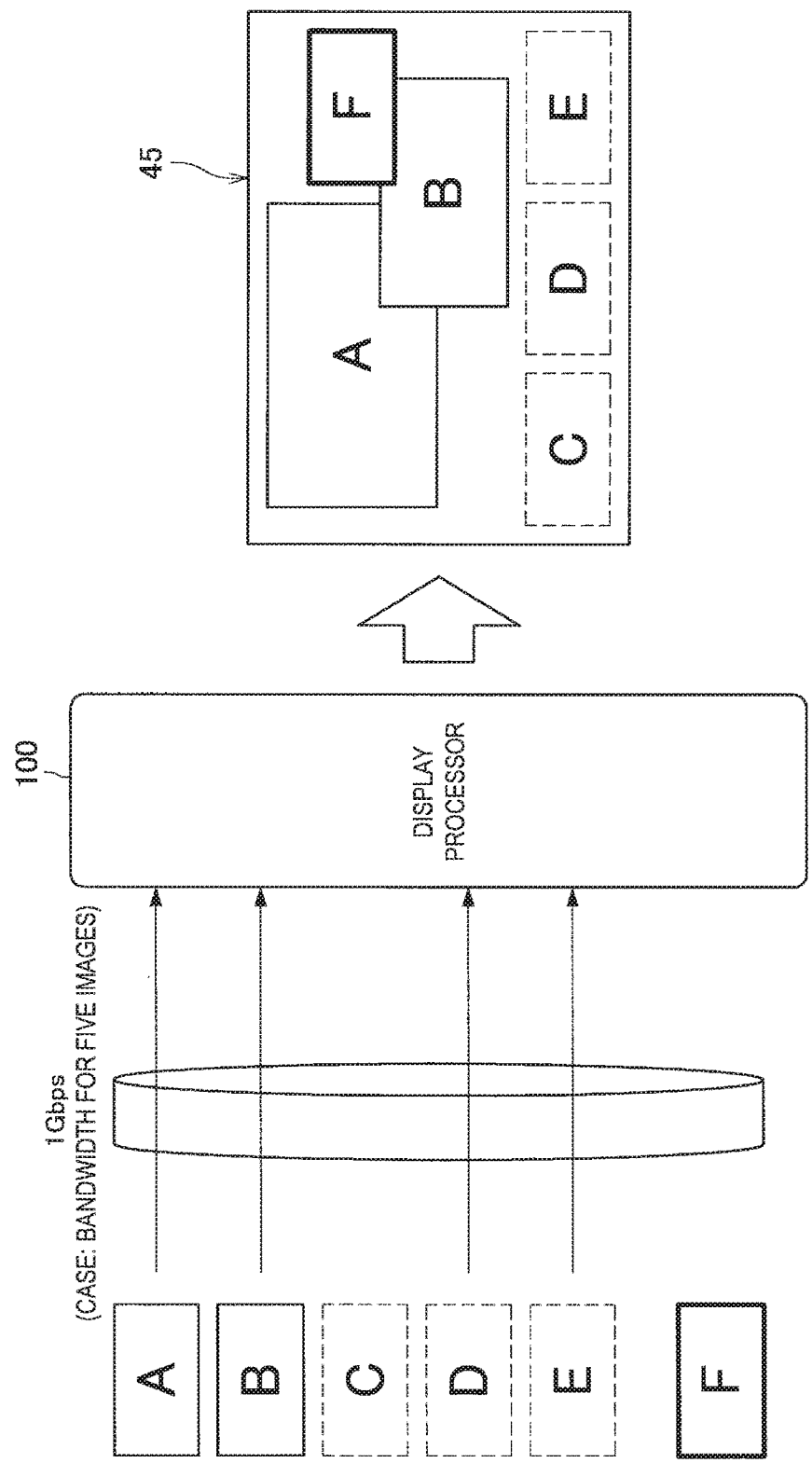

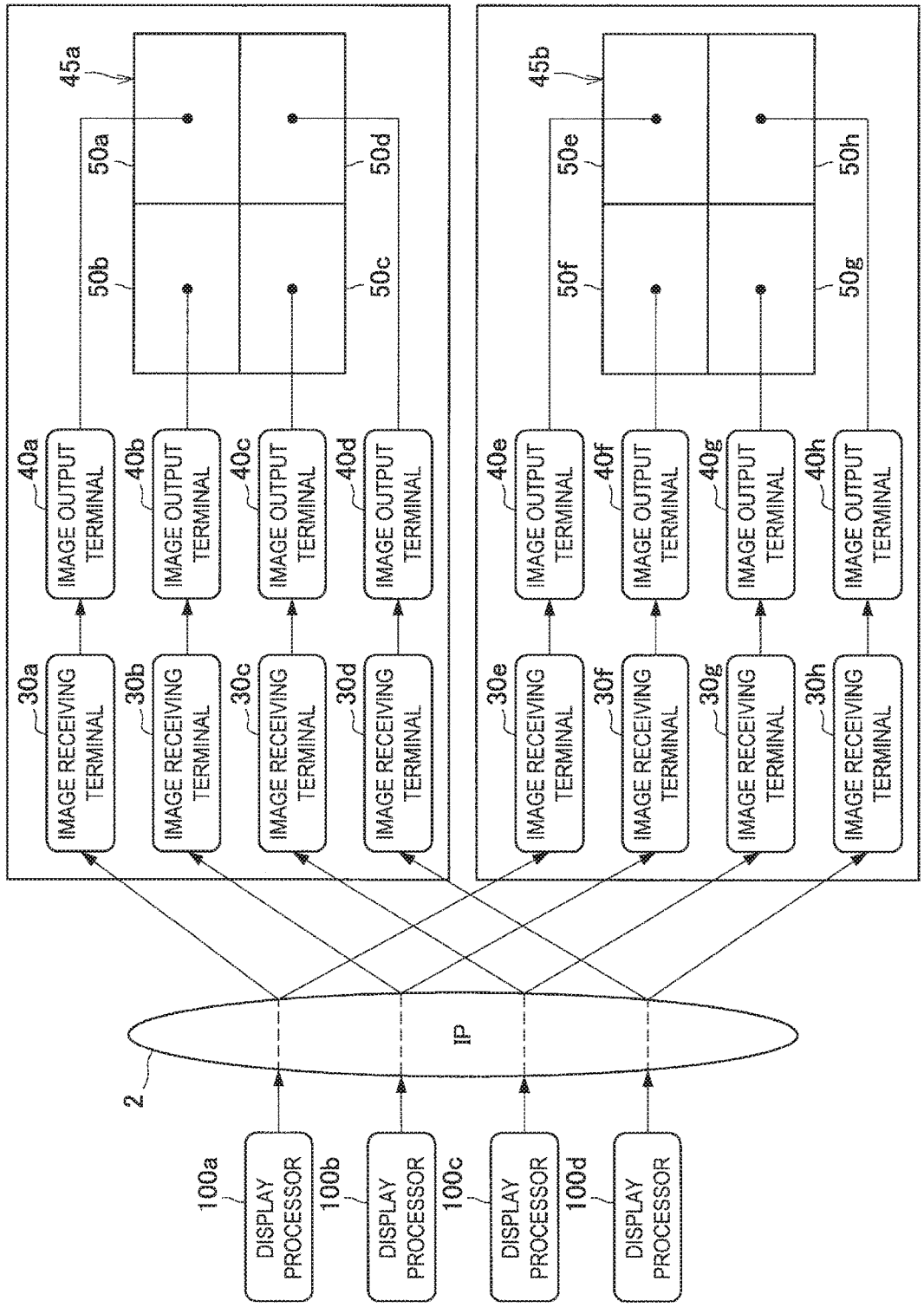
[Fig. 16]

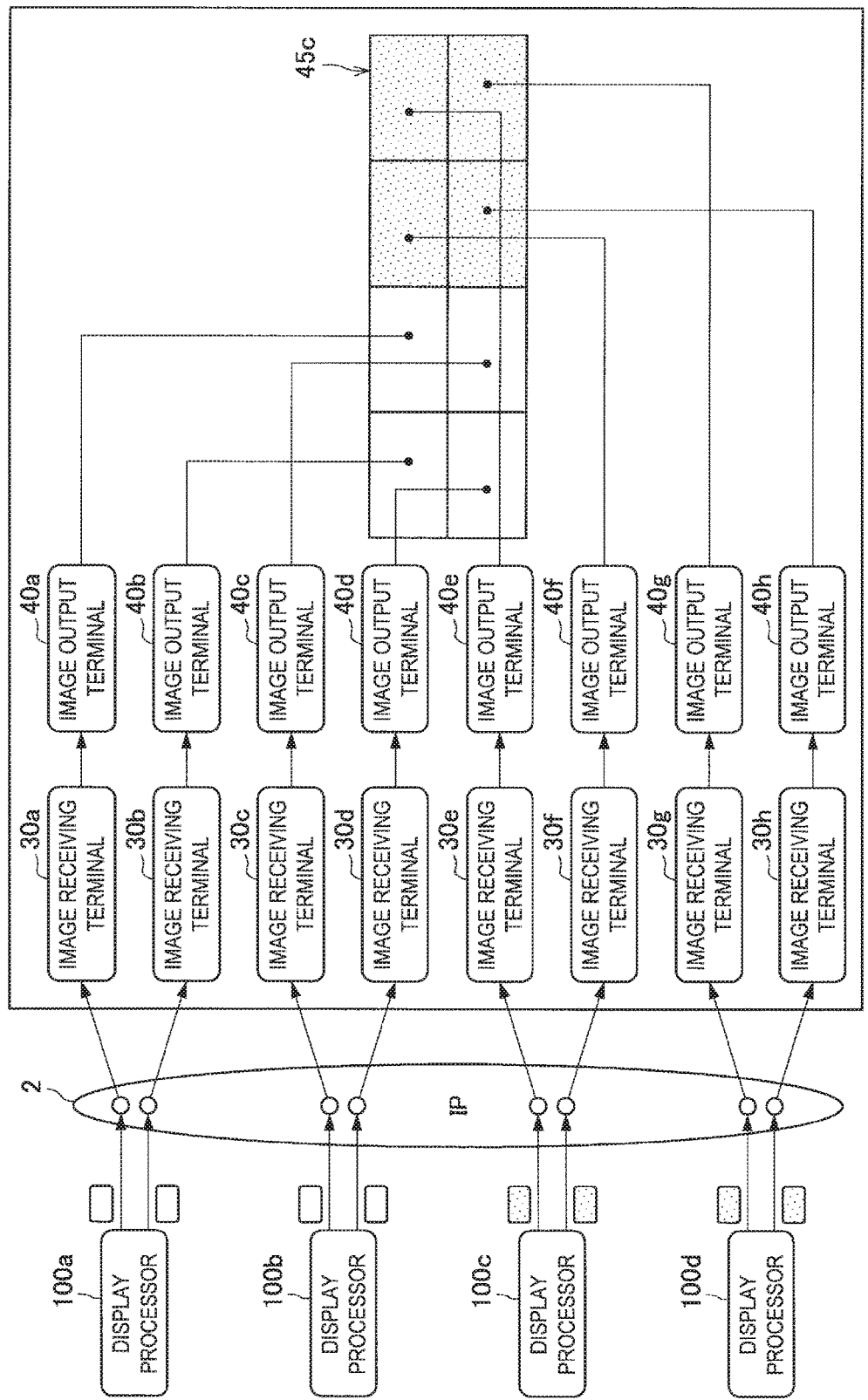
[Fig. 17A]

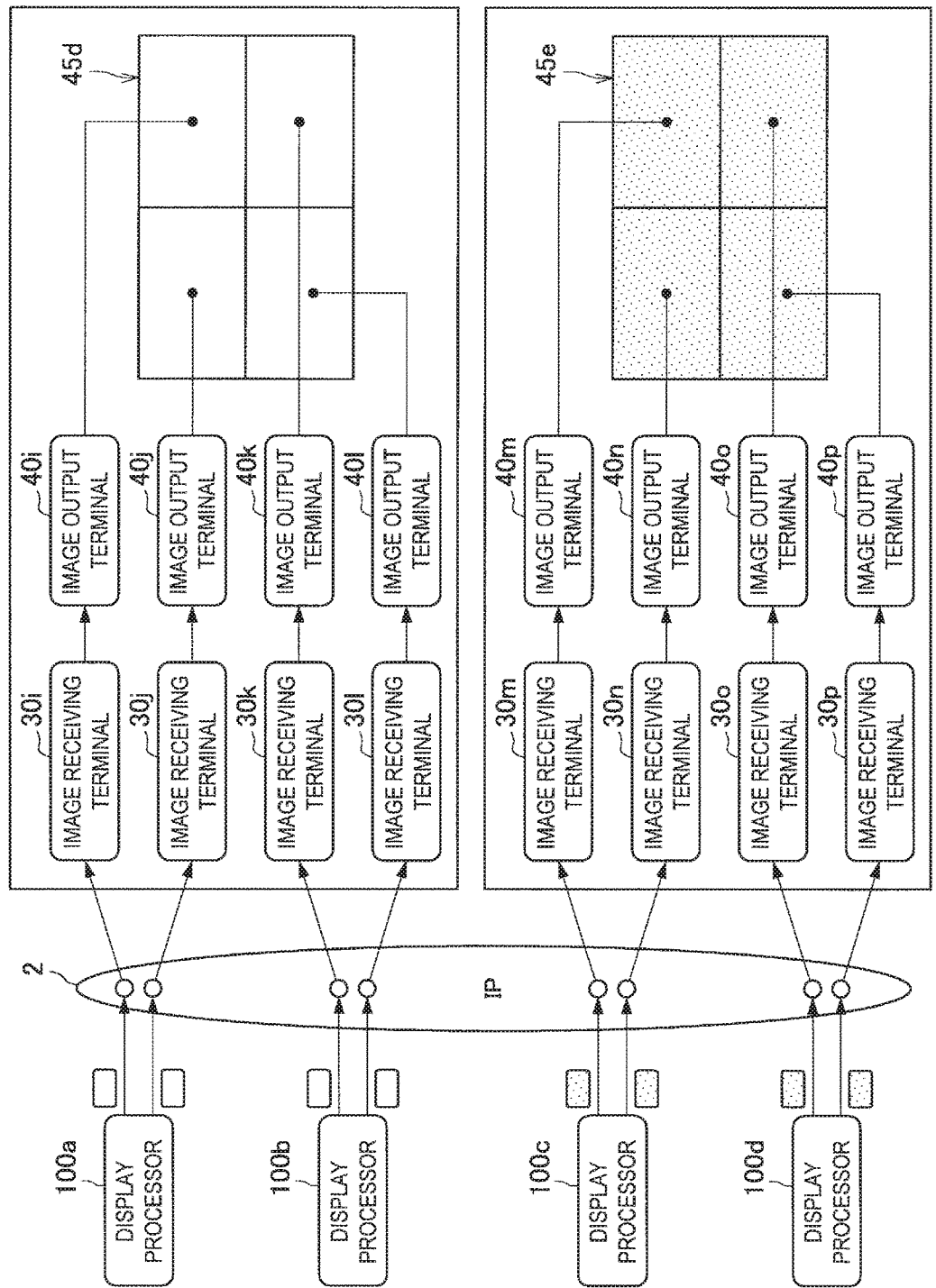
[Fig. 17B]

[Fig. 18]
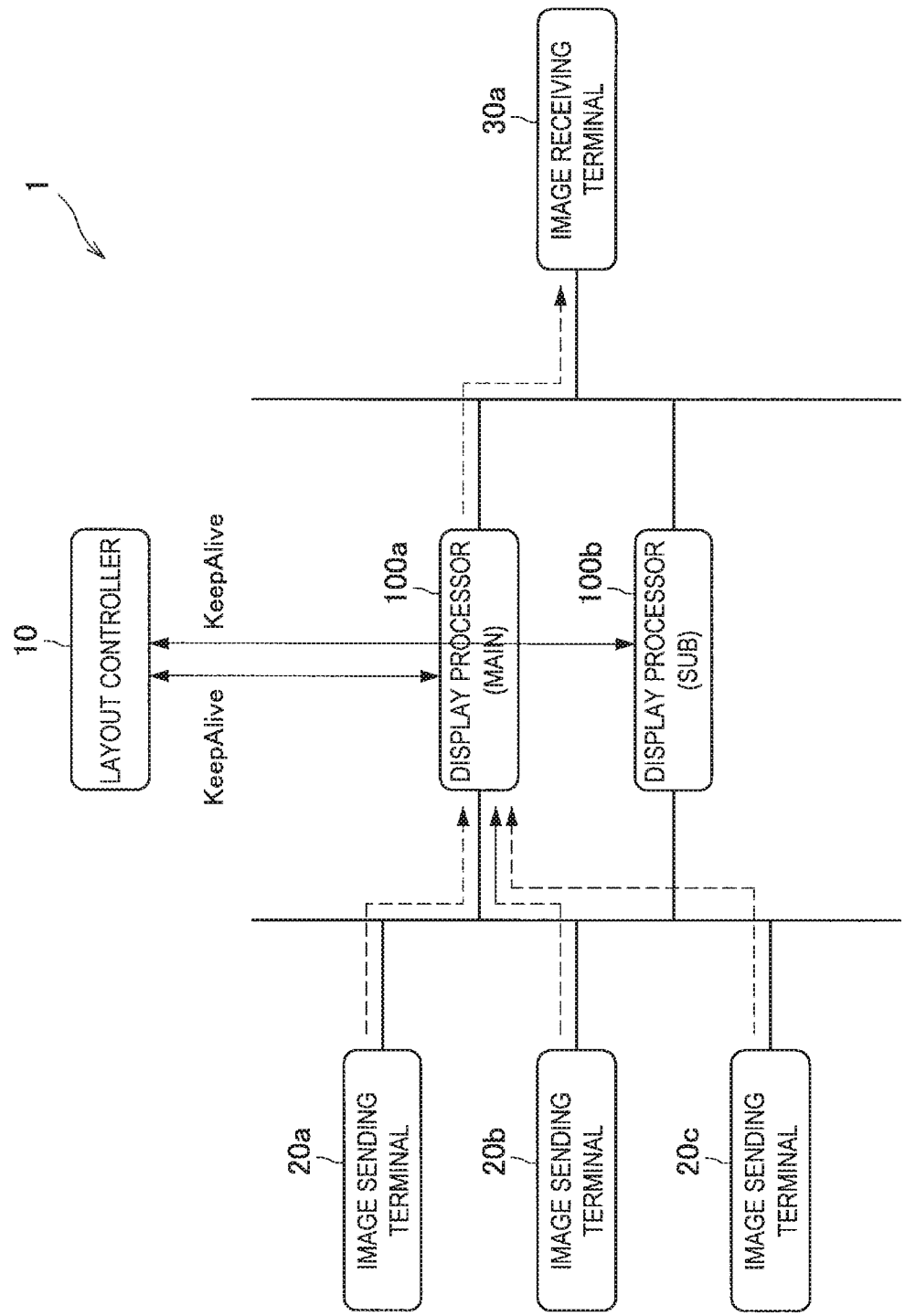

[Fig. 19]
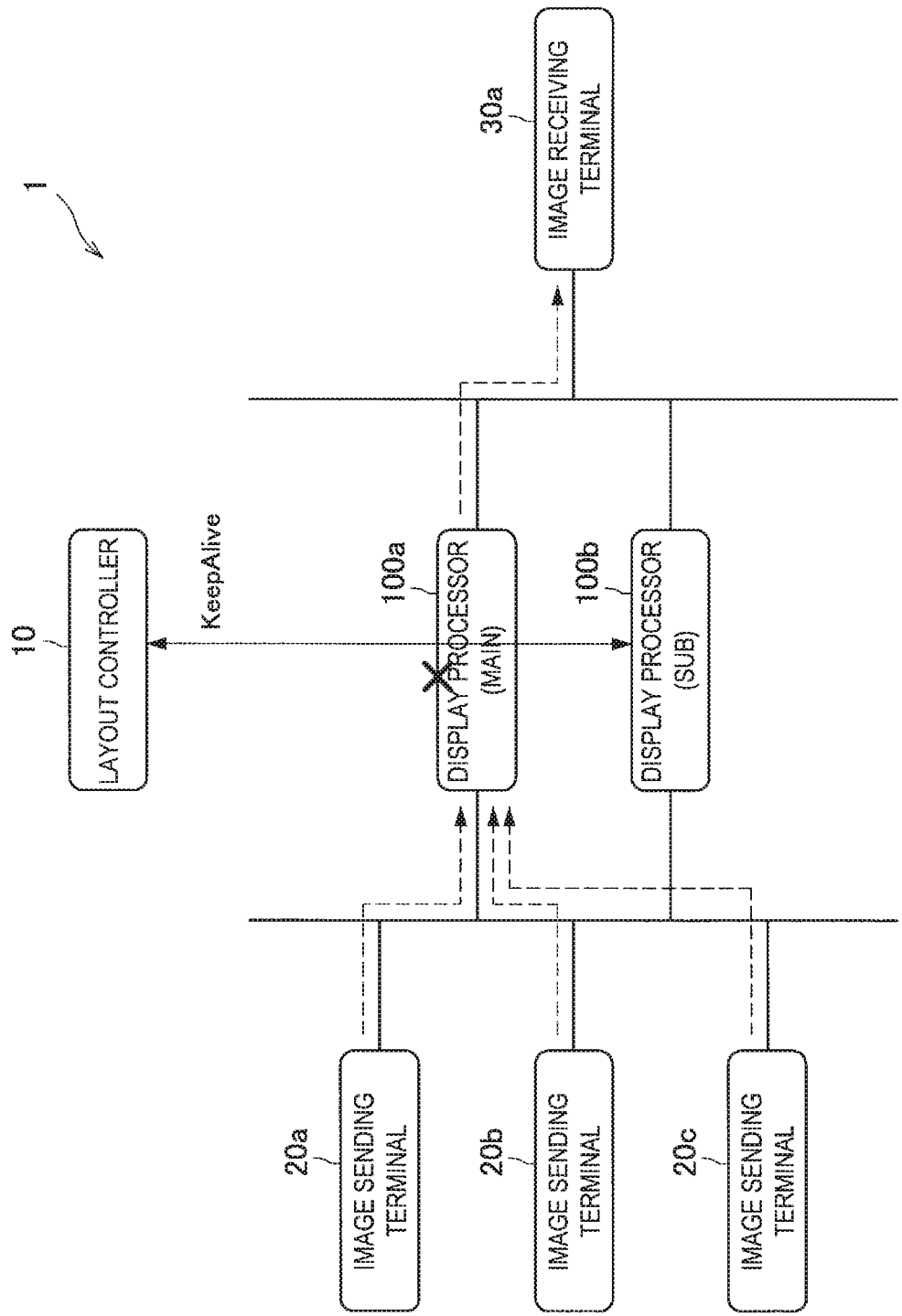

[Fig. 20]
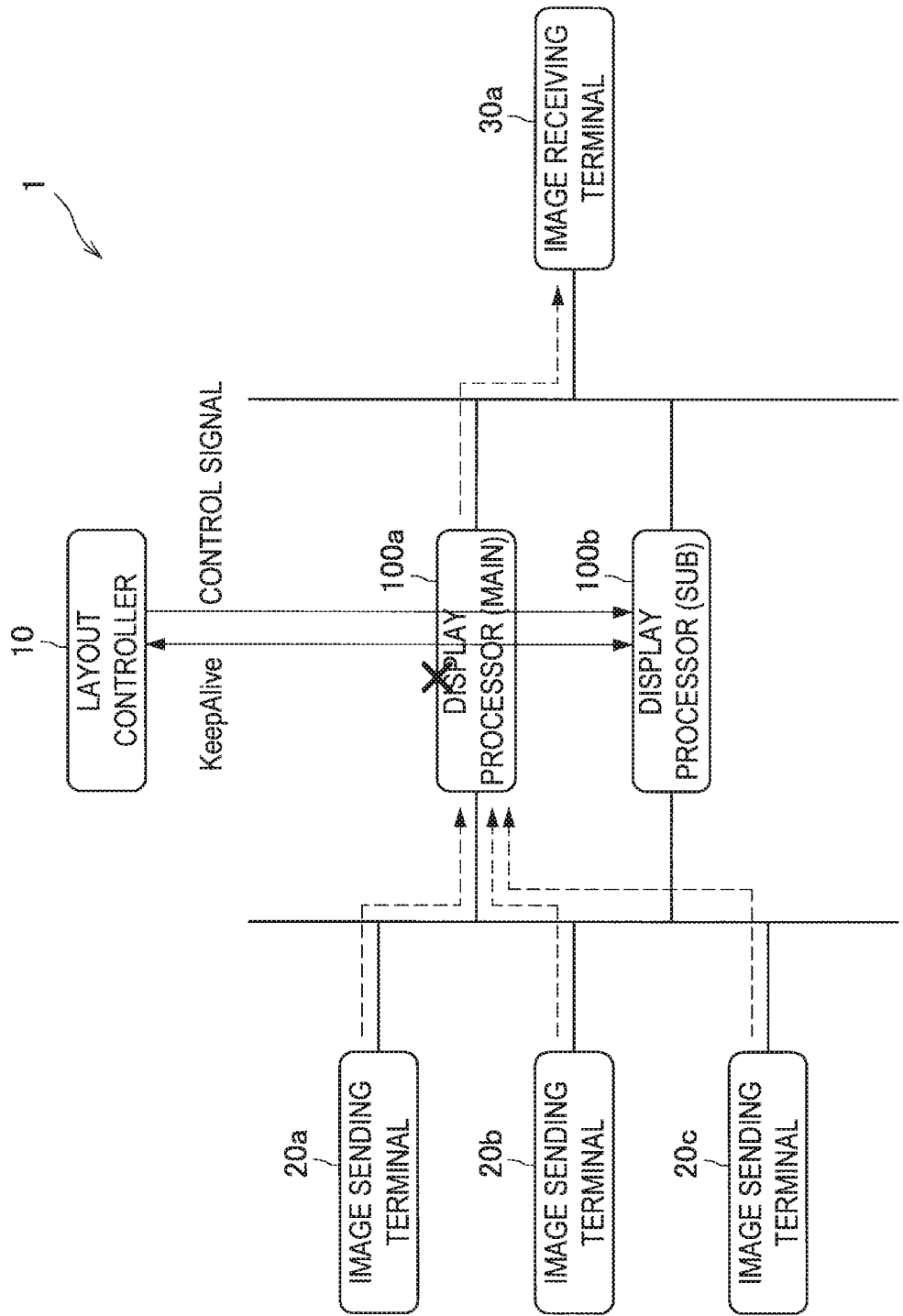

[Fig. 21]
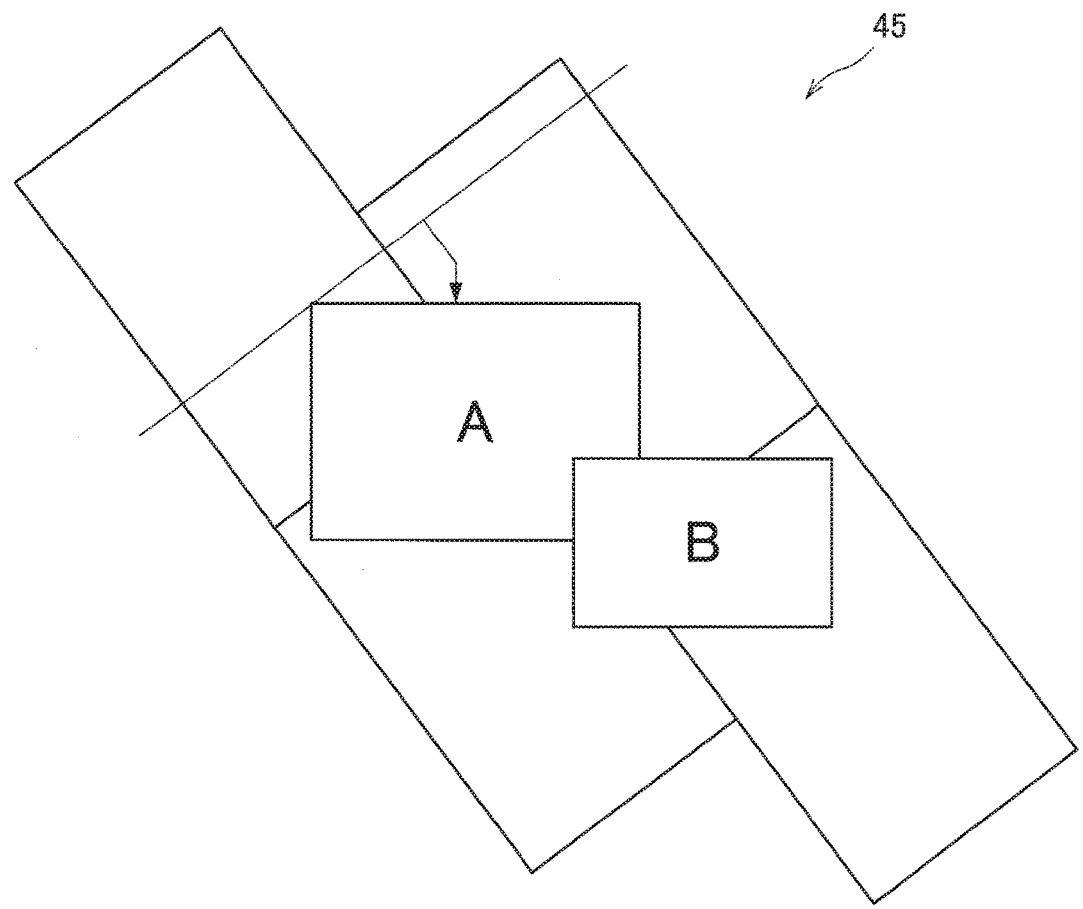
[Fig. 22]
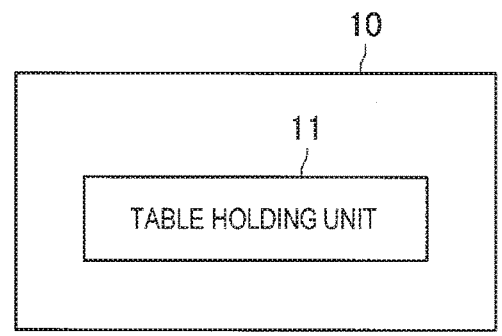

[Fig. 23]
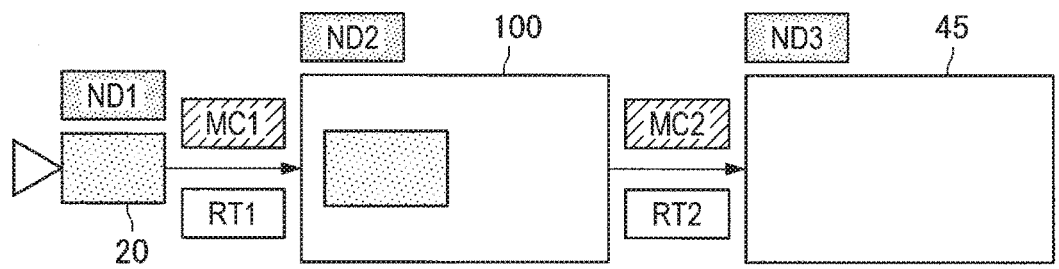
[Fig. 24]
| ID | Multicast Address |
|---|---|
| MC1 | 239.11.12.1 |
| MC2 | 239.11.12.2 |
T1

[Fig. 25]

| ID | Function | Receive Port # | Send Port # | Parameters |
|---|---|---|---|---|
| ND1 | Camera | 0 | 1 | X/Y size, fps, codec, rate, .. |
| ND2 | Display Processor (Color) | 1 | 1 | color space, .. |
| ND3 | Output Display | 1 | 0 | |

| ID | Multicast Address ID | Sender Node ID | Receiver Node ID |
|---|---|---|---|
| RT1 | MC1 | ND1 | ND2 |
| RT2 | MC2 | ND2 | ND3 |

T3

SIGNAL PROCESSING DEVICE, SIGNAL PROCESSING METHOD, AND IMAGE TRANSMISSION SYSTEM

CROSS REFERENCE TO RELATED APPLICATIONS

The present disclosure contains subject matter related to that disclosed in Japanese Priority Patent Application JP 2013-120597 filed in the Japan Patent Office on Jun. 7, 2013, the entire content of which is hereby incorporated by reference.

TECHNICAL FIELD

The present disclosure relates to a signal processing device, a signal processing method, a computer program, and an image transmission system.

BACKGROUND ART

There is a system for synthesizing images from a plurality of image output devices such as cameras or recorders that output images and displaying a synthesized image. In recent years, there is also a system for connecting together a plurality of image display devices into one display screen to allow such a synthesized image to be displayed on the large display screen (see Patent Literature 1).

CITATION LIST

Patent Literature

[PTL 1]
WO 08/056421

SUMMARY

Technical Problem

In existing techniques, one processor for executing an image process is associated with one image display device on a one-to-one basis. For this reason, a system has little flexibility due to hardware constraints of a processor and thus it is not easy to deal with its layout in a flexible way. In addition, in a case where a processor for executing an image process is associated with an image display device on a one-to-one basis, if a failure occurs in any one of processors or an additional image display device is to be provided, it is necessary to stop the entire system.

Therefore, embodiments of the present disclosure provide signal processing device, signal processing method, computer program, and image transmission system with increased availability and scalability of a system which synthesizes and displays a plurality of images.

Solution to Problem

According to an embodiment of the present disclosure, there is provided a signal processing device including a control information acquiring unit configured to acquire image control information regarding control of an image, an image receiver configured to selectively receive one or more images transmitted using multicast based on the image control information, one or more image processing units configured to perform an image process on an image received by the image receiver based on the image control information, and an image sender configured to transmit an image subjected to the image process by the image processing unit based on the image control information, the image being transmitted using multicast.

According to an embodiment of the present disclosure, there is provided a signal processing method including acquiring image control information regarding control of an image, selectively receiving one or more images transmitted using multicast based on the image control information, performing an image process on the selectively received image based on the image control information, and transmitting the image subjected to the image process based on the image control information, the image being transmitted using multicast.

According to an embodiment of the present disclosure, there is provided a computer program for causing a computer to execute acquiring image control information regarding control of an image, selectively receiving one or more images transmitted using multicast based on the image control information, performing an image process on the selectively received image based on the image control information, and transmitting the image subjected to the image process based on the image control information, the image being transmitted using multicast.

According to an embodiment of the present disclosure, there is provided an image processing system including an image control device, one or more image output devices, one or more signal processing devices, one or more image receiving devices, and one or more image display devices. The signal processing device includes a control information acquiring unit configured to acquire image control information regarding control of an image from the image control device, an image receiver configured to selectively receive one or more images transmitted using multicast from the one or more image output devices based on the image control information, one or more image processing units configured to perform an image process on an image received by the image receiver based on the image control information, the image process being for displaying the image on the one or more image display devices, and an image sender configured to transmit an image subjected to the image process by the image processing unit based on the image control information to cause the image to be received by the one or more image receiving devices, the image being transmitted using multicast.

Advantageous Effects of Invention

According to one or more embodiments of the present disclosure described above, it is possible to provide a novel and improved signal processing device, signal processing method, computer program, and image transmission system, capable of increasing the availability and scalability of a system which synthesizes and displays a plurality of images.

BRIEF DESCRIPTION OF DRAWINGS

FIG. 1 is an explanatory diagram illustrating an exemplary overall configuration of an image transmission system according to an embodiment of the present disclosure.

FIG. 2A is an explanatory diagram illustrating a general process of the image transmission system 1 according to an embodiment of the present disclosure.

FIG. 2B is an explanatory diagram illustrating a general process of the image transmission system 1 according to an embodiment of the present disclosure.

FIG. 3 is an explanatory diagram illustrating an exemplary user interface displayed on a screen of a layout controller 10.

FIG. 4 is an explanatory diagram illustrating a general process of the image transmission system 1 according to an embodiment of the present disclosure.

FIG. 5 is an explanatory diagram illustrating an exemplary functional configuration of a display processor 100 according to an embodiment of the present disclosure.

FIG. 6 is a flow diagram illustrating an exemplary operation of the image transmission system 1 according to an embodiment of the present disclosure.

FIG. 7 is a flow diagram illustrating an exemplary operation of the image transmission system 1 according to an embodiment of the present disclosure.

FIG. 8 is an explanatory diagram illustrating an example of an image displayed on the image display system 45 based on an exemplary operation of the image transmission system 1 according to an embodiment of the present disclosure.

FIG. 9 is an explanatory diagram illustrating an example of an image displayed on the image display system 45 based on an exemplary operation of the image transmission system 1 according to an embodiment of the present disclosure.

FIG. 10 is an explanatory diagram illustrating an example of an image transmitted based on an exemplary operation of the image transmission system 1 according to an embodiment of the present disclosure.

FIG. 11 is an explanatory diagram illustrating an example of an image transmitted based on an exemplary operation of the image transmission system 1 according to an embodiment of the present disclosure.

FIG. 12 is explanatory diagram illustrating an example of the control of image transmission or reception by the display processor 100 according to an embodiment of the present disclosure.

FIG. 13 is explanatory diagram illustrating an example of the control of image transmission or reception by the display processor 100 according to an embodiment of the present disclosure.

FIG. 14 is explanatory diagram illustrating an example of the control of image transmission or reception by the display processor 100 according to an embodiment of the present disclosure.

FIG. 15 is explanatory diagram illustrating an example of the control of image transmission or reception by the display processor 100 according to an embodiment of the present disclosure.

FIG. 16 is an explanatory diagram illustrating an example of transmission of an image in the image transmission system 1 according to an embodiment of the present disclosure.

FIG. 17A is an explanatory diagram illustrating an example of transmission of an image in the image transmission system 1 according to an embodiment of the present disclosure.

FIG. 17B is an explanatory diagram illustrating an example of transmission of an image in the image transmission system 1 according to an embodiment of the present disclosure.

FIG. 18 is an explanatory diagram illustrating an example of transmission of an image in the image transmission system 1 according to an embodiment of the present disclosure.

FIG. 19 is an explanatory diagram illustrating an example of transmission of an image in the image transmission system 1 according to an embodiment of the present disclosure.

FIG. 20 is an explanatory diagram illustrating an example of transmission of an image in the image transmission system 1 according to an embodiment of the present disclosure.

FIG. 21 is an explanatory diagram illustrating a modified example of the image display system 45.

FIG. 22 is an explanatory diagram illustrating an exemplary functional configuration of the layout controller 10 according to an embodiment of the present disclosure.

FIG. 23 is an explanatory diagram illustrating an exemplary configuration of the image transmission system 1 according to an embodiment of the present disclosure.

FIG. 24 is an explanatory diagram illustrating an example of a table stored in a table holding unit 11.

FIG. 25 is an explanatory diagram illustrating an example of a table stored in a table holding unit 11.

FIG. 26 is an explanatory diagram illustrating an example of a table stored in a table holding unit 11.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<1. Embodiment of the Present Disclosure>
(Exemplary Overall Configuration of System)
(General Process of System)
(Exemplary Functional Configuration of Display Processor)
(Exemplary Operation of Image Transmission System)
<2. Summary>

1. Embodiment of the Present Disclosure

Exemplary Overall Configuration of System

An exemplary overall configuration of an image transmission system according to an embodiment of the present disclosure will be described. FIG. 1 is an explanatory diagram illustrating an exemplary overall configuration of the image transmission system 1 according to an embodiment of the present disclosure. An exemplary overall configuration of the image transmission system 1 according to an embodiment of the present disclosure is described below with reference to FIG. 1.

As illustrated in FIG. 1, the image transmission system 1 according to an embodiment of the present disclosure is configured to include a layout controller 10, image sending terminals 20a to 20d, image receiving terminals 30a to 30d, image output terminals 40a to 40d, an image display system 45, and display processors 100a to 100d. The layout controller 10, the image sending terminals 20a to 20d, and the image receiving terminals 30a to 30d are connected to each other via an IP (Internet Protocol) network 2.

The image sending terminals 20a to 20d (hereinafter, sometimes referred simply to as an image sending terminal 20) are terminals for sending an image, such as cameras or recorders. In addition, the image sending terminals 20a to 20d are terminals for transmitting an image using IP multicast distribution.

The image receiving terminals 30a to 30d (hereinafter, sometimes referred simply to as an image receiving terminal 30) are terminals for receiving an image that is transmitted using IP multicast distribution from the image sending terminals 20a to 20d. The image receiving terminals 30a to 30d, when they receive an image, send the received image to the respective image output terminals 40a to 40d.

The image output terminals 40a to 40d (hereinafter, sometimes referred simply to as an image output terminal 40) receive an image from the image receiving terminals 30a to 30d, respectively, and output the image to the video display system 45. The image display system 45 is composed of a plurality of image display devices 50a to 50d, and each of the image display devices 50a to 50d displays a corresponding image outputted from the respective image sending terminals 20a to 20d.

The layout controller 10 determines the way that an image outputted from the image sending terminals 20a to 20d is displayed on the image display system 45. The layout controller 10 grasps the configuration of the image sending terminals 20a to 20d, the image receiving terminals 30a to 30d, and the display processors 100a to 100d, as well as the display shape and size of the image display system 45 composed of the image display devices 50a to 50d. The layout controller 10 instructs appropriately which one of the image sending terminals 20a to 20d to output an image, which one of the display processors 100a to 100d to process the image, and which one of the image receiving terminals 30a to 30d to receive the processed image.

The display processors 100a to 100d (hereinafter, sometimes referred simply to as a display processor 100) perform an image process on an image outputted from the image sending terminals 20a to 20d. The display processors 100a to 100d perform a previously specified image process on an image received based on an instruction from the layout controller 10. The display processors 100a to 100d then distribute the image after being subjected to the image process using IP multicast, based on an instruction from the layout controller 10.

The image transmission system 1 illustrated in FIG. 1 is a system in which the display processors 100a to 100d perform the image process on the image distributed using IP multicast from the image sending terminals 20a to 20d and re-distribute the processed image using IP multicast. In addition, the image transmission system 1 illustrated in FIG. 1 is a system in which the image receiving terminals 30a to 30d receive the image distributed using IP multicast from the display processors 100a to 100d and deliver the received image to the image output terminals 40a to 40d, and then the image display device 50 displays the image.

Thus, in the image transmission system 1 illustrated in FIG. 1, the image sending terminals 20a to 20d simply distribute an image to the IP network 2 using IP multicast based on predetermined settings or based on an instruction from the layout controller 10, rather than outputting the image to a particular image display device. In addition, the display processors 100a to 100d receive a specified image from among images that are transmitted from the image sending terminals 20a to 20d and perform an image process on the specified image. After the display processors 100a to 100d perform the image process, they distribute the processed image to the IP network 2 using IP multicast based on predetermined settings or based on an instruction from the layout controller 10. The image receiving terminals 30a to 30d receive the specified image and send it to the image output terminals 40a to 40d.

FIG. 1 illustrates the configuration in which four image sending terminals 20a to 20d, four image receiving terminals 30a to 30d, and four display processors 100a to 100d are connected to the IP network 2, but the present disclosure is not limited to this example. In an embodiment of the present disclosure, an image is transmitted via the IP network 2 using IP multicast distribution, and thus this makes it possible to increase the availability and scalability of a system which synthesizes and displays a plurality of images.

Moreover, in FIG. 1, the image receiving terminals 30a to 30d are illustrated as being terminals different from the image output terminals 40a to 40d, but the present disclosure is not limited to this example. A terminal for receiving an image distributed using IP multicast may be integrated with a terminal for outputting an image to the image display system 45.

An exemplary overall configuration of the image transmission system 1 according to an embodiment of the present disclosure is described above with reference to FIG. 1. A general process of the image transmission system 1 according to an embodiment of the present disclosure will be described.

(General Process of System)

FIGS. 2A and 2B are explanatory diagrams illustrating a general process of the image transmission system 1 according to an embodiment of the present disclosure. FIGS. 2A and 2B illustrate an example of the flow of an image in the image transmission system 1 in the case of the image transmission system 1 having the configuration as illustrated in FIG. 1. A general process of the image transmission system 1 according to an embodiment of the present disclosure will be described below with reference to FIGS. 2A and 2B.

The image which is transmitted from the image sending terminals 20a to 20d is distributed to the IP network 2 using IP multicast based on predetermined settings or an instruction from the layout controller 10. The layout controller 10 sends a control signal to the respective corresponding display processors 100a to 100d in accordance with the layout determined by the layout controller 10. This control signal is transmitted from the layout controller 10 to the respective corresponding display processors 100a to 100d through the IP network 2.

The control signal which is transmitted from the layout controller 10 may include information on the image sending terminal, information on an image position, time information (information of image switching timing), and information on the image receiving terminal.

The Information on the image sending terminal may include connection destination information (multicast address and port number) and codec information. The information on an image position may include the display shape and size of the image display system 45, information about the position, size, display angle, superimposition, or the like of an image displayed on the image display system 45, and information on the number of displays to be managed by the image display system 45. The information on the image receiving terminal may include output destination information (multicast address and port number) and codec information.

FIG. 3 is an explanatory diagram illustrating an example of a user interface that is displayed on a screen of the layout controller 10. A list of images that are transmitted from the image sending terminals 20a to 20d and the display position of each image displayed on the image display system 45 are shown on the user interface v10 illustrated in FIG. 3. The user of the layout controller 10 can determine an image to be displayed and a position at which the image is displayed, by means of the user interface v10 illustrated in FIG. 3. FIG. 3 illustrates an example of a case where an image is displayed on the image display system 45 in which six screens in the horizontal direction and four screens in the vertical direction are arranged in a matrix form.

The display processors 100a to 100d receive selectively an image transmitted using IP multicast distribution from the image sending terminals 20a to 20d and perform a predetermined image process on the received image based on the control signal.

When the display processors 100a to 100d perform the image process, each of them distributes the image after being subjected to the image process using IP multicast to the IP network 2 based on an instruction from the layout controller 10. The image receiving terminals 30a to 30d receive selectively the image distributed using IP multicast from the display processors 100a to 100d based on an instruction from the layout controller 10. Each of the image receiving terminals 30a to 30d sends the received image to the image output terminals 40a to 40d. Each of the image output terminals 40a to 40d outputs the image transmitted from the image receiving terminals 30a to 30d to the image display system 45 which is composed of the image display devices 50a to 50d.

The image transmission system 1 according to an embodiment of the present disclosure transmits an image as shown in FIGS. 2A and 2B, and thus this makes it possible to increase the availability and scalability of a system which synthesizes and displays a plurality of images.

FIG. 4 is an explanatory diagram illustrating a general process of the image transmission system 1 according to an embodiment of the present disclosure. FIG. 4 illustrates an example of a case where an image distributed using IP multicast from five display processors 100a to 100e is displayed on the image display system 45.

In the image transmission system 1 according to an embodiment of the present disclosure, the display processors 100a to 100e, which are provided independently of each other, generate an image to be displayed on a corresponding portion of display areas in the image display system 45 and distribute the generated image using IP multicast.

In the example illustrated in FIG. 4, the display processor 100a generates an image to be displayed on an area A among display areas of the image display system 45. The display processor 100b generates an image to be displayed on an area B among the display areas of the image display system 45. The display processor 100c generates an image to be displayed on an area C among the display areas of the image display system 45. The display processor 100d generates an image to be displayed on an area D among the display areas of the image display system 45. The display processor 100e generates an image to be displayed on an area E among the display areas of the image display system 45. Thus, each of the display processors 100a to 100e includes a frame buffer for each of the respective areas assigned to the display processors.

The display processors 100a to 100e according to an embodiment of the present disclosure are configured to selectively receive an image, perform an image process on the received image, and distribute the image after being subjected to the image process using IP multicast, based on an instruction from the layout controller 10, when a plurality of images are synthesized and displayed on the image display system 45.

A general process of the image transmission system 1 according to an embodiment of the present disclosure is described above. An exemplary functional configuration of the display processors 100a to 100d (hereinafter, sometimes referred simply to as a display processor 100) according to an embodiment of the present disclosure will be described.

(Exemplary Functional Configuration of Display Processor)

FIG. 5 is an explanatory diagram illustrating an exemplary functional configuration of the display processor 100 according to an embodiment of the present disclosure. Referring to FIG. 5, an exemplary functional configuration of the display processor 100 according to an embodiment of the present disclosure will be described.

As illustrated in FIG. 5, the display processor 100 is configured to include a control signal control unit 102, a multicast reception control unit 104, an image editing management unit 106, a multicast transmission control unit 108, an image receiver 110, decoders 112a to 112d, image editing processing units 114a and 114b, encoders 116a and 116b, and an image sender 118.

The control signal control unit 102 acquires a control signal that is transmitted from the layout controller 10. The control signal control unit 102 then controls the operation of the multicast reception control unit 104, the image editing management unit 106, the multicast transmission control unit 108, and decoders 112a to 112d, based on the acquired control signal.

The multicast reception control unit 104 controls the image receiver 110 to receive an image specified by the control signal from among the images distributed using IP multicast to the IP network 2, based on the control of the control signal control unit 102.

The image editing management unit 106 manages the image editing processing units 114a and 114b based on the control of the control signal control unit 102. More specifically, the image editing management unit 106 instructs the image editing processing units 114a and 114b to perform an editing process of the contents specified by the control signal based on the control of the control signal control unit 102. For example, the image editing management unit 106 instructs the image editing processing units 114a and 114b to perform the editing process such as segmentation, zooming, and positioning of an image received by the image receiver 110.

The multicast transmission control unit 108 controls the image sender 118 to distribute an image to the IP network 2 using IP multicast based on the control of the control signal control unit 102.

The image receiver 110 receives an image (encoded image) being distributed using IP multicast to the IP network 2. Specifically, the image receiver 110 selectively receives an image specified by the multicast reception control unit 104 from among images being distributed using IP multicast to the IP network 2. Although FIG. 5 illustrates the image receiver 110 capable of simultaneously receiving four or more images, the present disclosure is not limited to this example. The number of images that can be received simultaneously by the image receiver 110 may be dependent on bandwidth of the IP network 2, bandwidth of an image to be received, the number of decoders provided in the display processor 100, or the like. The image receiver 110, when it receives an image specified by the multicast reception control unit 104, sends the received image to the decoders 112a to 112d.

The decoders 112a to 112d decode the encoded image that is received by the image receiver 110. When the decoders 112a to 112d decode the encoded image, they output the decoded image to the image editing processing units 114a and 114b. The decoders 112a to 112d determine their respective destinations to which the images are outputted, based on predetermined settings or the control of the control signal control unit 102.

The image editing processing units 114a and 114b perform an image editing process on an image outputted from the decoders 112a to 112d, based on the instruction from the image editing management unit 106. The image editing process performed by the image editing processing units 114a and 114b may include segmentation, zooming, positioning, or the like of the image outputted from the decoders 112a to 112d. The image editing processing units 114a and 114b, when they perform the image editing process on the image, output the edited image to the encoders 116a and 116b, respectively. FIG. 5 illustrates the configuration in which the display processor 100 includes two image editing processing units 114a and 114b. However, the number of the image editing processing units 114a and 114b may be the same as the number of images that can be transmitted from the image sender 118.

The encoders 116a and 116b encode an image outputted respectively from the image editing processing units 114a and 114b. The encoders 116a and 116b output the encoded image to the image sender 118, based on predetermined settings or the control of the control signal control unit 102.

The image sender 118 sends the image encoded by the encoders 116a and 116b to the IP network 2 using IP multicast distribution, based on the control of the multicast transmission control unit 108. Although FIG. 5 illustrates the image sender 118 that sends two or more images using IP multicast distribution, the present disclosure is not limited to this example.

An exemplary functional configuration of the display processor 100 according to an embodiment of the present disclosure is described above with reference to FIG. 5. An exemplary operation of the image transmission system 1 according to an embodiment of the present disclosure will be described.

(Exemplary Operation of Image Transmission System)

FIG. 6 is a flow diagram showing an exemplary operation of the image transmission system 1 according to an embodiment of the present disclosure. The flow diagram shown in FIG. 6 illustrates the flow from when a layout of an image to be displayed on the image display system 45 is determined by the layout controller 10 to when the image is displayed on the image display system 45, as a sequence diagram. An exemplary operation of the image transmission system 1 according to an embodiment of the present disclosure will be described with reference to FIG. 6.

The layout controller 10 makes a request for the start of transmission of an image to the image sending terminal 20 (step S101). The image sending terminal 20 distributes the image using multicast to a transmission destination (multicast addresses) that is specified by the layout controller 10 or specified previously (step S102).

Subsequently, when the layout controller 10 determines the layout of an image displayed on the image display system 45 based on a user's operation through the user interface as shown in FIG. 3 (step S103), the layout controller 10 sends a request to the display processor 100 based on the determined layout (step S104). This request is intended that the display processor 100 selectively receives the image distributed using multicast from the image sending terminal 20, performs the image process on the received image, and re-sends the processed image. This request in step S104 is made by allowing the layout controller 10 to send a control signal to the display processor 100.

The display processor 100, when it receives the request from the layout controller 10, receives an image specified to be received from among images distributed using multicast from the image sending terminal 20 based on the request from the layout controller 10 (step S105). As described above, the control signal includes information on a connection destination such as multicast addresses and port numbers as information of the image sending terminal. The display processor 100 can select an image to be received from among images flowing through the IP network 2 based on the information on the connection destination such as multicast addresses and port numbers.

The display processor 100, when it receives the image in step S105, performs an image process on the received image. The image process performed by the display processor 100 may include segmentation, zooming, positioning, or the like of the image as described above. Then, the display processor 100, when it performs the image process on the received image, distributes the image using multicast to the transmission destination (multicast address) that is specified by the layout controller 10 or specified previously (step S106).

The layout controller 10 makes a request to the image receiving terminal 30 for the start of reception of the image which is distributed using multicast to the IP network 2 by the display processor 100 based on the determined layout (step S107).

The image receiving terminal 30 selectively receives an image to be received from among the images being distributed using multicast to the IP network 2 based on the request from the layout controller 10 (step S108). The image receiving terminal 30 outputs the received image to the image output terminal 40 (step S109). The image output terminal 40 outputs the image outputted from the image receiving terminal 30 to the respective corresponding image display devices of the image display system 45.

The image transmission system 1 according to an embodiment of the present disclosure performs the operation as described above, and thus this makes it possible to display the images distributed using IP multicast to the IP network 2 by the image sending terminal 20 on the image display system 45, based on the layout of images determined by the layout controller 10.

The layout controller 10 can change the layout of images to be displayed on the image display system 45 while the images are displayed on the display system 45. Subsequently, there will be described an exemplary operation of the image transmission system 1 according to an embodiment of the present disclosure in the case where the layout controller 10 changes the layout of images to be displayed on the image display system 45 while the images are displayed on the image display system 45.

FIG. 7 is a flow diagram showing an exemplary operation of the image transmission system 1 according to an embodiment of the present disclosure. The flow diagram shown in FIG. 7 illustrates the flow in the case where the layout controller 10 changes the layout of images to be displayed on the image display system 45 while the images are displayed on the image display system 45, as a sequence diagram. Referring now to FIG. 7, there will be described an exemplary operation of the image transmission system 1 according to an embodiment of the present disclosure.

The image sending terminal 20 distributes an image using multicast to the transmission destination (multicast address) that is specified by the layout controller 10 or specified previously (step S111). In this state, when the layout controller 10 changes the layout of images displayed on the image display system 45 based on the user's operation through the user interface as shown in FIG. 3 (step S112), the layout controller 10 sends a request to the display processor 100 based on the determined layout (step S113).

This request is intended that the display processor 100 selectively receives the image distributed using multicast from the image sending terminal 20, performs the image process on the received image, and re-sends the processed image. This request in step S113 is made by allowing the layout controller 10 to send a control signal to the display processor 100.

The layout controller 10 acquires a layout change event and performs a layout change process by setting a frame as the minimum value.

The display processor 100, when it receives the request from the layout controller 10, receives an image specified to be received according to changes in the layout from among images distributed using multicast from the image sending terminal 20 based on the request from the layout controller 10. In addition, the display processor 100 terminates the reception of an image that is unnecessary according to changes in the layout based on the request from the layout controller 10 (step S114).

The display processor 100, when it performs the image process on the received image, distributes the image using multicast to the transmission destination (multicast address) that is specified by the layout controller 10 or specified previously (step S115).

The layout controller 10 makes a request to the image receiving terminal 30 for the start of reception of the image distributed using multicast to the IP network 2 by the display processor 100 based on the determined layout (step S116).

The image receiving terminal 30 selectively receives an image to be received from among the images distributed using multicast to the IP network 2 based on the request from the layout controller 10 (step S117). The image receiving terminal 30 outputs the received image to the image output terminal 40 (step S118). The image output terminal 40 outputs the image outputted from the image receiving terminal 30 to the respective corresponding image display devices of the image display system 45.

The image transmission system 1 according to an embodiment of the present disclosure performs the operation as described above, and thus this makes it possible to display the images distributed using IP multicast to the IP network 2 by the image sending terminal 20 on the image display system 45 in a state where the image is displayed on the image display system 45 based on the layout of images changed by the layout controller 10.

An exemplary operation of the image transmission system 1 according to an embodiment of the present disclosure is described above. An image to be displayed on the image display system 45 will be described in more detail based on an exemplary operation of the image transmission system 1 according to an embodiment of the present disclosure described above.

FIG. 8 is an explanatory diagram illustrating an example of an image displayed on the image display system 45 based on an exemplary operation of the image transmission system 1 according to an embodiment of the present disclosure. FIG. 8 illustrates a case where images transmitted from three image sending terminals 20a to 20c are displayed on the image display system 45 composed of sixteen displays arranged in a matrix of four rows and four columns. The image sending terminals 20a to 20c are respectively illustrated in FIG. 8 as a television camera. In addition, four display processors 100a to 100d are also illustrated in FIG. 8.

It is assumed that, among the displays of the image display system 45, the display processor 100a is assigned previously to four displays at the upper left corner (area A in FIG. 8), the display processor 100b is assigned previously to four displays at the upper right corner (area B in FIG. 8), the display processor 100c is assigned previously to four displays at the lower left corner (area C in FIG. 8), and the display processor 100d is assigned previously to four displays at the lower right corner (area D in FIG. 8). These display processors are assigned previously to be in charge of their respective image process. Accordingly, each of the display processors 100a to 100d is configured to be able to simultaneously output four images.

It is considered the case where images outputted from the image sending terminal 20a, the image sending terminal 20b, and the image sending terminal 20c are displayed on the area A, the area B, and the area C, respectively, and this is determined by the layout controller 10. The display processor 100a is in charge of the image process in the area A, and thus the layout controller 10 instructs the display processor 100a to receive the image distributed using IP multicast from the image sending terminal 20a. Similarly, the display processor 100b is in charge of the image process in the area B, and thus the layout controller 10 instructs the display processor 100b to receive the image distributed using IP multicast from the image sending terminal 20b. In addition, similarly, the display processor 100c is in charge of the image process in the area C, and thus the layout controller 10 instructs the display processor 100c to receive the image distributed using IP multicast from the image sending terminal 20c. Meanwhile, nothing is displayed on the area D, and thus the layout controller 10 does not instruct the display processor 100d to receive an image.

The display processor 100a, when it receives the image distributed using IP multicast from the image sending terminal 20a, performs the image process such as segmentation or enlargement on the received image so that the received image is displayed on four displays in the area A of the image display system 45. Similarly, the display processors 100b and 100c receive an image distributed using IP multicast from the image sending terminals 20b and 20c, respectively, and perform the image process such as segmentation or enlargement on the received image. In addition, the display processors 100a to 100c update the position of the image in units of pixels in each vertical scanning period V.

The display processors 100a to 100c send a multicast IGMP (Internet Group Management Protocol) Join message to a specified multicast address from the information on the image sending terminals, which is included in the control signal received from the layout controller 10, and start the reception of an image. The image to be received becomes a source of an image displayed on each area managed by the respective display processors 100a to 100c.

Subsequently, the display processors 100a to 100c acquire how to arrange an image in an area where each of the display processors is in charge of displaying an image, from image position information included in the control signal received from the layout controller 10. In the example shown in FIG. 8, the display processors 100a to 100c determine that all of the received images are used rather than segmenting some of them, because all of the images are included in the areas where the display processors 100a to 100c are in charge of displaying the images.

In the example shown in FIG. 8, each of the display processors 100a to 100c is in charge of four displays. In other words, each of the display processors 100a to 100c is in charge of processing of the display images in four image receiving terminals 30 and four image output terminals 40. Thus, each of the display processors 100a to 100c calculates how to arrange the received image in the four displays according to a parameter acquired from the image position information, generates an image to be transmitted to the respective image output terminals 40, and re-sends the generated image to the specified multicast address. The image receiving terminal 30 performs a reception process on the image addressed to the multicast address which is specified from the layout controller 10 or is set previously, and provides the received image to the image output terminal 40 for displaying.

In this way, the image outputted from each of the display processors 100a to 100c is received by the image receiving terminal 30 based on an instruction of the layout controller 10 and is displayed on the image display system 45. The image display system 45 can display an image in accordance with the layout specified by the layout controller 10 by simply allowing the respective displays to output the image.

FIG. 9 is an explanatory diagram illustrating another example of the image displayed on the image display system 45 based on the exemplary operation of the image transmission system 1 according to an embodiment of the present disclosure. FIG. 9 illustrates a case where an image transmitted from one image sending terminal 20a is displayed on the image display system 45 composed of 16 displays that are arranged in a matrix of four rows and four columns. The image sending terminal 20a is illustrated in FIG. 9 as a television camera. In addition, four display processors 100a to 100d are also illustrated in FIG. 9. It is assumed that the displays in which the display processors 100a to 100d are in charge of the image process are the same as those shown in FIG. 8.

It is considered a case where the layout controller 10 determines to allow images outputted from the image sending terminal 20 to be displayed on the areas A to D. The layout controller 10 instructs all of the display processors 100a through 100d to receive an image distributed using IP multicast from the image sending terminal 20.

The display processor 100a, when it receives an image distributed using IP multicast from the image sending terminal 20a based on the instruction of the layout controller 10, performs the image process such as segmentation or enlargement on the received image to be displayed on each of the four displays of the area A in the image display system 45. Similarly, each of the display processors 100b, 100c, and 100d also receives an image distributed using IP multicast from the image sending terminal 20a and performs the image process such as segmentation or enlargement on the received image.

The example shown in FIG. 9 is the case where images are displayed across a plurality of areas as well as areas of which the display processors 100a to 100d are in charge. In a similar way to the example shown in FIG. 8, the display processors 100a to 100d send a multicast IGMP Join message to a specified multicast address from the information on the image sending terminals, which is included in the control signal received from the layout controller 10, and start the reception of an image.

Subsequently, each of the display processors 100a to 100d acquires how to arrange an image in an area where each of them is in charge of displaying, from image position information included in the control signal received from the layout controller 10. In the example shown in FIG. 9, the display processors 100a to 100d determine that a segmentation process is performed on some of the received images, because some of the images are enlarged and used in the areas where the display processors 100a to 100d are in charge of displaying.

The display processors 100a to 100d may perform, for example, two kinds of procedures when they perform the segmentation process on an image. One of both is that the display processors 100a to 100d themselves perform the process by grasping the position of which the display processors 100a to 100d take charge for the entire display of the image display system 45. For example, when the coordinates of the entire display in the image display system 45 range from (0, 0) to (x, y), it is necessary for the display processors 100a to 100d to grasp in advance a range of which each of them is in charge among the coordinate ranges. When this method is employed, the display processors 100a to 100d acquire the shape and size of the entire display of the image display system 45 from the image position information, and calculate a position of the display image corresponding to the coordinates of the entire display of the image display system 45. Then, the display processors 100a to 100d identify the area at which they are in charge of displaying, and perform the segmentation process, if necessary, on an image to be displayed on the area at which they are in charge of displaying.

The other method is that the layout controller 10 performs calculation of the area at which the respective display processors 100a to 100d are in charge of displaying an image on the entire display of the image display system 45. For example, when the coordinates of the entire display in the image display system 45 range from (0, 0) to (x, y), it is necessary for the layout controller 10 to grasp in advance a range of which each of the display processors 100a to 100d is in charge among the coordinate ranges. When this method is employed, the layout processor 10 causes the image position information to contain information on image display areas together with the display position. The display processors 100a to 100d perform the image segmentation process based on the information on image display areas transmitted from the layout controller 10.

Also in the example shown in FIG. 9, each of the display processors 100a to 100d is in charge of four displays. In other words, each of the display processors 100a to 100d is in charge of processing an image to be displayed in four image receiving terminals 30 and four image output terminals 40. Accordingly, each of the display processors 100a to 100d calculates how to arrange the received image in each of the four displays in accordance with a parameter acquired from the image position information, generates an image to be transmitted to the respective image output terminals 40, and re-sends the generated image to the specified multicast address. The image receiving terminal 30 performs the reception process on the image addressed to the multicast address which is specified from the layout controller 10 or is set previously, and provides the received image to the image output terminal 40 for displaying it.

The display processors 100a to 100d distribute the image subjected to the image process using IP multicast as described above. The image outputted from the display processors 100a to 100d are received by the image receiving terminal 30 and are displayed on the image display system 45, based on the instruction of the layout controller 10. The image display system 45 can display an image in accordance with the layout specified by the layout controller 10 by simply allowing the respective displays to output the image.

In the two examples described above, there is illustrated an example in which the display processor 100 receives only an image from one image sending terminal 20 and performs the image process on the received image, but the present disclosure is not limited to this example. The display processor 100 may receive simultaneously images from the image sending terminal 20 and may perform the image process in units of images. In addition, the display processor 100 may perform a superimposition process (image superimposition process according to the superimposed order that is specified or set previously) of the received image. Furthermore, the display processor 100 may perform a rotation process of the received image.

In this way, the image transmission system 1 according to an embodiment of the present disclosure allows an image outputted from the image sending terminal 20 to be displayed on the image display system 45 in accordance with the layout specified by the layout controller 10. However, when the display processor 100 outputs an image, if there is a gap in the output timing of the image, it is difficult to display properly the image on the image display system 45. Thus, the display processor 100 outputs an image in synchronization with another display processor 100.

FIGS. 10 and 11 are explanatory diagrams illustrating an example of an image transmitted based on the exemplary operation of the image transmission system 1 according to an embodiment of the present disclosure. FIGS. 10 and 11 illustrate three image sending terminals 20a to 20c and four display processors 100a to 100d. In the example illustrated in FIGS. 10 and 11, an image outputted from the image sending terminal 20a is instructed to be received by the display processors 100a to 100d, an image outputted from the image sending terminal 20b is instructed to be received by the display processors 100c and 100d, and an image outputted from the image sending terminal 20c is instructed to be received by the display processor 100d. In addition, each of the display processors 100a to 100d is configured to be able to output simultaneously four images in a similar way to the example shown in FIGS. 8 and 9.

When the transmission and reception of an image are performed as shown in FIG. 10, each of the display processors 100a to 100d outputs an image in synchronization with other display processors 100a to 100d.

Each of the display processors 100a to 100d receives an image outputted from the image sending terminals 20a to 20c, but its reception timing may be changed constantly depending on the condition of the IP network 2. FIG. 11 illustrates an example of the reception timing of the image received by the respective display processors 100a to 100d.

The display processors 100a to 100d output an image in synchronization with House Sync (a synchronization signal serving as a reference). The display processors 100a to 100d can synchronize the output timing of an image with other display processors 100a to 100d by outputting an image in synchronization with House Sync.

Subsequently, there will be described the control of transmission and reception of an image that is transmitted from the image sending terminal 20. This control is performed by the display processor 100 based on the control signal from the layout controller 10.

FIGS. 12 to 15 are explanatory diagrams illustrating an example of the image sending or receiving control by the display processor 100 according to an embodiment of the present disclosure.

FIG. 12 illustrates a case in which, in the state where the display processor 100 receives five images A, B, C, D, and E, the images C, D, and E are out of their respective areas taken in charge by the respective corresponding display processors. When the images C, D, and E are out of their respective areas taken in charge by the respective corresponding display processors, the display processor 100 continues to receive the images C, D, and E as long as bandwidth of the IP network 2 is allowed, rather than immediately stop receiving the images C, D, and E. In the examples shown in FIGS. 12 to 15, it is assumed that bandwidth for five images are reserved. Thus, the display processor 100 can continue to receive five images A, B, C, D, and E.

Even when the images C, D, and E are out of their respective areas taken in charge by the respective corresponding display processors, the display processor 100 continues to receive the images C, D, and E as long as bandwidth of the IP network 2 is allowed. This is because the images C, D, and E are intended to be displayed immediately on the image display system 45 when these images are included again in their respective areas taken in charge by the respective corresponding display processors.

FIG. 13 illustrates a case where an image F is intended to be received based on an instruction of the layout controller 10. If there is available bandwidth in the IP network 2, the display processor 100 may be configured to receive the image F based on an instruction from the layout controller 10. However, in the case where the five images A, B, C, D, and E have been received as illustrated in FIG. 12, even if the image F is intended to be received based on an instruction from the layout controller 10, it is difficult for the display processor 100 to start reception of the image F immediately. Thus, the display processor 100 stops receiving an image according to a predetermined rule to reserve bandwidth for receiving the image F. As an example of the predetermined rule, in this example, there is illustrated a method of reserving bandwidth for receiving a new image by stopping reception of an image in a descending order of time from the image that has not been displayed for the longest period of time.

For example, if the image C is an image that has not been displayed for the longest period of time, the display processor 100 sends an IGMP Leave message to stop receiving the image C, as illustrated in FIG. 13. The IGMP Leave message may be transmitted, for example, by the image receiver 110 based on the control of the multicast reception control unit 104.

The display processor 100 then starts receiving an image using the bandwidth reserved by stopping reception of the image C. FIG. 14 illustrates a case where the display processor 100 sends an IGMP Join message to receive the image F. The IGMP Join message may be transmitted, for example, by the image receiver 110 based on the control of the multicast reception control unit 104. FIG. 15 illustrates a state where the display processor 100 is receiving the image F based on the IGMP Join message.

The display processor 100 controls the image transmission and reception as illustrated in FIGS. 12 to 15, and thus it is possible to process a switching operation when an image that has been displayed once comes back to an area in a short time. In addition, the display processor 100 can control the start or stop of display of a particular image (for example, an important image intended to be displayed with low delay) with low delay, by setting priority to each image or by providing a traffic control such that some image are maintained in a protected condition and its reception is not stopped.

In the image transmission system 1 according to an embodiment of the present disclosure, images transmitted from the display processor 100 are distributed using IP multicast, and thus it is possible for the plurality of image receiving terminals 30 to receive simultaneously the images. Accordingly, the image transmission system 1 according to an embodiment of the present disclosure can allow images to be displayed on a plurality of image display systems 45 in the same manner in accordance with the layout determined by the layout controller 10.

FIG. 16 is an explanatory diagram illustrating an example of transmitting an image in the image transmission system 1 according to an embodiment of the present disclosure. FIG. 16 illustrates an example of sending an image in the image transmission system 1 when images transmitted from the display processors 100a to 100d are displayed on both the image display systems 45a and 45b. In FIG. 16, there are illustrated image receiving terminals 30a to 30d and image output terminals 40a to 40d, which are used to display an image on the image display system 45a. In FIG. 16, also there are illustrated image receiving terminals 30e to 30h and image output terminals 40e to 40h, which are used to display an image on the image display system 45b. In addition, in FIG. 16, there are illustrated image display devices 50a to 50d that constitute the image display system 45a, and image display devices 50e to 50h that constitute the image display system 45b.

The layout controller 10 (not shown in FIG. 16) instructs the image receiving terminals 30a and 30e to receive an image transmitted from the display processor 100a. Similarly, the layout controller 10 instructs the image receiving terminals 30b and 30f to receive an image transmitted from the display processor 100b. Similarly, the layout controller 10 instructs the image receiving terminals 30c and 30g to receive an image transmitted from the display processor 100c. Furthermore, similarly, the layout controller 10 instructs the image receiving terminals 30d and 30h to receive an image transmitted from the display processor 100d.

The layout controller 10 instructs the image receiving terminals 30a to 30h to receive the respective images as described above, and thus it is possible to display images on the plurality of image display systems 45a and 45b in the same manner in accordance with the layout determined by the layout controller 10.

FIG. 16 illustrates an example in which identical images are displayed on the plurality of image display systems 45a and 45b, but the image transmission system 1 can allow some of images to be displayed on another image display system in accordance with the layout determined by the layout controller 10.

FIGS. 17A and 17B are explanatory diagrams illustrating an example of transmitting an image in the image transmission system 1 according to an embodiment of the present disclosure. FIGS. 17A and 17B illustrate an example of transmitting an image in the image transmission system 1 when images transmitted from the display processors 100a to 100d are displayed on the image display systems 45c, 45d, and 45e. FIG. 17A illustrates the image receiving terminals 30a to 30h and image output terminals 40a to 40h used to display an image on the image display system 45c. In addition, FIG. 17B illustrates image receiving terminals 30i to 30l and image output terminals 40i to 40l used to display an image on the image display system 45d, and image receiving terminals 30m to 30p and image output terminals 40m to 40p used to display an image on the image display system 45e.

In the examples shown in FIGS. 17A and 17B, each of the image display systems 45d and 45e has the same number of displays in the vertical direction as the image display system 45c, but has half as many displays in the horizontal direction as those of the image display system 45c. In addition, for the sake of convenience, an example of transmitting an image in the image transmission system 1 according to an embodiment of the present disclosure is illustrated in two separate forms of FIGS. 17A and 17B, but the image transmission illustrated in FIG. 17A is performed simultaneously with that illustrated in FIG. 17B.

The display processors 100a to 100d illustrated in FIGS. 17A and 17B are respectively configured to be possible to send two images simultaneously using IP multicast distribution.

The layout controller 10 (not shown in FIGS. 17A and 17B) instructs the image receiving terminals 30a and 30b to receive respectively an image transmitted from the display processor 100a. Similarly, the layout controller 10 instructs the image receiving terminals 30c and 30d to receive respectively the image transmitted from the display processor 100b. Similarly, the layout controller 10 instructs the image receiving terminals 30e and 30f to receive respectively the image transmitted from the display processor 100c. Furthermore, similarly, the layout controller 10 instructs the image receiving terminals 30g and 30h to receive respectively the image transmitted from the display processor 100d.

Moreover, the layout controller 10 instructs the image receiving terminals 30i and 30j to receive respectively an image transmitted from the display processor 100a. Similarly, the layout controller 10 instructs the image receiving terminals 30k and 30l to receive respectively the image transmitted from the display processor 100b. Similarly, the layout controller 10 instructs the image receiving terminals 30m and 30n to receive respectively the image transmitted from the display processor 100c. Furthermore, similarly, the layout controller 10 instructs the image receiving terminals 30o and 30p to receive respectively the image transmitted from the display processor 100d.

In this way, the layout controller 10 instructs the image receiving terminals 30a to 30p to receive respectively an image, and thus it is possible to display an image on the plurality of image display systems 45c in accordance with the layout determined by the layout controller 10 and it is possible to allow a portion of the images displayed on the image display system 45c to be displayed on the image display systems 45d and 45e.

The image transmission system 1 according to an embodiment of the present disclosure transmits an image as illustrated in FIGS. 17A and 17B, and thus it is possible to display an image on the respective image display systems 45c, 45d, and 45e depending on the form of the image display system. For example, the image transmission system 1 according to an embodiment of the present disclosure can allow only the right half images of the images displayed on the image display system 45c to be displayed on both the image display systems 45d and 45e. In addition, for example, the image transmission system 1 according to an embodiment of the present disclosure can allow only the right half images and only the left half images of the images displayed on the image display system 45c to be displayed on the image display systems 45d and the image display systems 45e, respectively.

The image sending terminal 20, the display processor 100, and the image receiving terminal 30 which constitute the image transmission system 1 according to an embodiment of the present disclosure are all connected to the IP network 2. Thus, as long as the display processor 100 is connected to the IP network 2, it is possible to use any terminal without considering physical environments such as an installation place or a distance from the display processor 100 to the image sending terminal 20 and/or the image receiving terminal 30. Accordingly, in the image transmission system 1 according to an embodiment of the present disclosure, when a certain display processor 100 does not operate normally due to a failure or the like, it is possible to switch easily the existing route to a route in which an image is outputted via any other display processor without changing the wiring connection.

As an example, the image transmission system 1 according to an embodiment of the present disclosure may hold a bypass route (a backup route) in advance as a system, and thus it is possible to continue the operation by switching automatically the existing route to a predetermined bypass route in failure of a particular display processor 100. A method of selecting a bypass route may include, for example, a method of allowing the layout controller 10 to manage the state of the display processor 100 and then, when the layout controller 10 detects a failure of the display processor 100, sending a control signal equivalent to the control signal held by the failed display processor 100 to a display processor 100 to be switched and operated. The switched display processor 100 starts the operation based on the contents of the control signal received from the layout controller 10, and thus it is possible for the image receiving terminal 30 to continue reception of an image without especially considering the failure of the display processor 100.

FIGS. 18 to 20 are explanatory diagrams illustrating an example of transmitting an image in the image transmission system 1 according to an embodiment of the present disclosure. FIGS. 18 to 20 illustrate, when a failure occurs in a certain display processor 100*a*, how to continue the transmission of an image from the image sending terminal 20 to the image receiving terminal 30 by diverting the route to another display processor 100*b*.

FIGS. 18 to 20 illustrate how to configure the image transmission system 1 with three image sending terminals 20*a* to 20*c*, two display processors 100*a* and 100*b*, and one image receiving terminal 30*a*. It is assumed that the display processor 100*a* operates in a normal condition, but the display processor 100*b* operates when a failure occurs in the display processor 100*a*.

FIG. 18 is an explanatory diagram illustrating an example of transmitting an image in a normal condition. In a normal condition, an image distributed using IP multicast from the image sending terminals 20*a* to 20*c* is assumed to be received and processed by the display processor 100*a* and be transmitted to the image receiving terminal 30*a*, based on the control signal from the layout controller 10. The layout controller 10 then sends a KeepAlive signal to the display processors 100*a* and 100*b*, and checks whether the display processors 100*a* and 100*b* are operating.

FIG. 19 is an explanatory diagram illustrating a state in which a failure occurs in the display processor 100*a*. The layout controller 10 determines that a failure has occurred in the display processor 100*a* when there is no response from the display processor 100*a*. When a failure occurs in the display processor 100*a*, the layout controller 10 instructs the display processor 100*b* to receive an image distributed using IP multicast from the image sending terminals 20*a* to 20*c*.

FIG. 20 is an explanatory diagram illustrating a state in which the display processor 100*b* is instructed to receive an image because a failure has occurred in the display processor 100*a*. The layout controller 10 sends a control signal equivalent to the control signal that has been transmitted to in the display processor 100*a* to the display processor 100*b*. The display processor 100*b* receives and processes an image distributed using IP multicast from the image sending terminals 20*a* to 20*c* based on the control signal from the layout controller 10.

In this way, when a failure occurs in the display processor 100*a* that operates in a normal condition, the image transmission system 1 according to an embodiment of the present disclosure can continuously perform the transmission of an image from the image sending terminals 20*a* to 20*c* to the image receiving terminal 30 by simply re-sending a control signal from the layout controller 10 to the other display processor 100*b*.

In the example given above, the image display systems 45 are all systems in which a plurality of displays are arranged in the vertical and horizontal directions, but the present disclosure is not limited to the example. For example, the image display system 45 may be configured to include a plurality of displays that are arranged in an inclined manner.

FIG. 21 is an explanatory diagram illustrating a modified example of the image display system 45. As illustrated in FIG. 21, the image display system 45 may be configured to include a plurality of displays that are arranged in an obliquely inclined manner. In addition, as illustrated in FIG. 21, the image display system 45 may be configured to include displays that are arranged in an obliquely inclined manner and are further shifted from each other.

When an image is displayed on the image display system 45 as illustrated in FIG. 21, the display processor 100 may perform an image process for rotating the image that is transmitted from the image sending terminal 20 so that the image is displayed horizontally. FIG. 21 illustrates a state where two images A and B are displayed on the image display system 45, and the rotation process is performed on both of the two images A and B by the display processor 100.

The layout controller 10 acquires information regarding the display processor 100 connected to the IP network 2 and holds it therein previously. If the processing order of the display processor 100 is changed, then the layout controller 10 generates a control signal by using the previously acquired information regarding the display processor 100 and sends the generated control signal to the respective display processors 100.

FIG. 22 is an explanatory diagram illustrating a functional configuration example of the layout controller 10 according to an embodiment of the present disclosure. As illustrated in FIG. 22, the layout controller 10 according to an embodiment of the present disclosure is configured to include a table holding unit 11. The table holding unit 11 holds the information regarding the display processor 100 connected to the IP network 2 in the form of a table.

In the present embodiment, although there is illustrated an example in which the layout controller 10 holds the information regarding the display processor 100 connected to the IP network 2, the present disclosure is not limited to such an example. The information regarding the display processor 100 connected to the IP network 2 may be held in another device which can be referred from the layout controller 10.

An example of a table stored in the table holding unit 11 will be described. An exemplary configuration of the image transmission system 1 is first illustrated to describe an example of a table stored in the table holding unit 11. FIG. 23 is an exemplary configuration of the image transmission system 1 according to an embodiment of the present disclosure, and this exemplary configuration is intended to describe an example of a table stored in the table holding unit 11. In FIG. 23, the image sending terminal 20 used to capture an image and output the captured image, the display processor 100, and the image display system 45 are illustrated. In FIG. 23, although the image receiving terminal 30 and the image output terminal 40 are not illustrated, it is assumed that they are included in the image transmission system 1.

There will be described reference numerals denoted in FIG. 23. NDn (n=1, 2, 3, ... is an ID for managing a node. MCn (n=1, 2, ... is an ID for managing a multicast address that is used when an image is outputted from each node. RTn (n=1, 2, ... is an ID for managing a route between nodes. In the example shown in FIG. 23, the image sending terminal 20 is managed as ND1, the display processor 100 is managed as ND2, and the image display system 45 is managed as ND3. In addition, a route from the image sending terminal 20 to the display processor 100 is managed as RT1, and a route from the display processor 100 to the image display system 45 is managed as RT2.

Furthermore, in the example shown in FIG. 23, an image is outputted from the image sending terminal 20 to a multicast address MC1, and an image is outputted from the display processor 100 to a multicast address MC2.

FIG. 24 is an explanatory diagram illustrating an example of a table stored in the table holding unit 11. FIG. 24 illustrates an example of a multicast address management table T1 which is used to manage a multicast address. An ID (serial number) for managing a multicast address when an image is outputted from each node is registered in the column of ID in the multicast address management table T1, and a multicast address corresponding to each ID is registered in the column of MulticastAddress in the multicast address management table T1.

FIG. 25 is an explanatory diagram illustrating an example of a table stored in the table holding unit 11. FIG. 25 illustrates an example of a node management table T2 which is used to manage a node. In the node management table T2, information regarding a node of the image sending terminal 20, the display processor 100, the image receiving terminal, or the like is managed. An ID (serial number) for managing each node is registered in the column of ID in the node management table T2, and a function of each node (camera, display processor, output display, or the like) is registered in the column of Function in the node management table T2, information regarding the number of ports for receiving an image is registered in the column of ReceivePort in the node management table T2, information regarding the number of ports for transmitting an image is registered in the column of SendPort in the node management table T2, and information regarding setting parameters for each node is registered in the column of Parameters in the node management table T2. An example of the information regarding the setting parameters for each node may include the horizontal and vertical size of an image, information on the number of frames per second (fps), information on codec, information on bandwidth, information on color space, or the like. In addition, although it is not shown in FIG. 25, information about the upper limit of the processing capability of each node may be stored in the node management table T2.

FIG. 26 is an explanatory diagram illustrating an example of a table stored in the table holding unit 11. FIG. 26 illustrates an example of a route management table T3 used to manage a route. The route management table T3 manages information on a route, that is, information about how an image is transmitted from which node to which node. An ID (serial number) for managing each route is registered in the column of ID in the route management table T3, the ID (serial number) managed in the multicast address management table T1 is registered in the column of MulticastAddressID in the route management table T3, and the ID (serial number) managed in the node management table T2 is registered in the columns of SenderNodeID and ReceiverNodeID in the route management table T3. An ID of a transmission source node of a corresponding route is registered in the column of SenderNodeID, and an ID of a transmission destination node of a corresponding route is registered in the column of ReceiverNodeID.

In a case where an image is distributed from one transmission node to a plurality of receiving nodes, the route management table T3 stores a plurality of rows, each having an identical multicast address and transmission node, but having different receiving nodes.

FIGS. 24 to 26 illustrate an example of each table when the image sending terminal 20 (node 1) sends an image to the multicast address 239.11.12.1 (address 1), the display processor 100 having a color change function (node 2) receives the image transmitted from the image sending terminal 20, performs a color change process on the received image, and sends the processed image to the multicast address 239.11.12.2 (address 2), and the image receiving terminal 30 (node 3) for receiving an image to be displayed on the image display system 45 receives the image transmitted from the display processor 100 and displays the received image.

The table holding unit 11 holds data as described above, and thus the layout controller 10 can cause the display processor 100 to receive an image outputted from the image sending terminal 20 and to perform the color change process on the received image, and cause the image receiving terminal 30 to receive the image outputted from the display processor 100.

2. Summary

As described above, according to an embodiment of the present disclosure, there is provided the display processor 100 which receives an image transmitted from the image sending terminal 20 which distributes an image using IP multicast based on an instruction from the layout controller 10. When the display processor 100 receives an image distributed using IP multicast from the image sending terminal 20, it performs a predetermined image process on the received image and re-sends the processed image using IP multicast distribution. The image distributed using IP multicast from the display processor 100 is received by the image receiving terminal 30 and is displayed on the image display system 45, based on an instruction from the layout controller 10.

In addition, according to an embodiment of the present disclosure, it is possible to cause a plurality of display processors 100 to take partial charge of the image process as well as to cause one display processor 100 to take full charge of the image process. Even when the number of displays of the image display system 45 or the displayable size of an image is increased, it is possible to display an image on the image display system 45 by causing a plurality of display processors 100 to take partial charge of the image process.

Furthermore, in an embodiment of the present disclosure, the display processor 100 is connected to the IP network 2, and thus even when the system is extended or modified, it is not necessary to switch a wiring connection as long as the display processor 100 is connected to the IP network 2. In addition, in an embodiment of the present disclosure, the display processor 100 is connected to the IP network 2, and thus even when a failure occurs in a certain display processor 100a, it is possible to perform continuously transmission of an image by allowing the failed display processor to be easily switched to another display processor 100.

In an embodiment of the present disclosure, an image that is transmitted from the image sending terminal 20 is distributed using multicast via the IP network 2. The display processor 100 receives only a specified image, and thus, in an embodiment of the present disclosure, it is possible to utilize bandwidth effectively by using multicast distribution. In addition, in an embodiment of the present disclosure, it is possible to prevent traffic from being concentrated on a particular display processor 100 by allowing a plurality of display processors 100 to take partial charge of the process as necessary.

In an embodiment of the present disclosure, the image subjected to the image process by the display processor 100 is distributed using multicast via the IP network 2. Accordingly, in an embodiment of the present disclosure, a plurality of image display systems 45 can use an image outputted from the display processor 100.

It is not necessary for each step in the process performed by each device described in the present specification to be processed in a time series according to the order described in the sequence diagram or flowchart. For example, each step in the process performed by each device may be processed in the order different from the order described as the flowchart, or may be processed in parallel.

Moreover, it is also possible to create a computer program for causing hardware such as CPU, ROM, and RAM incorporated in each device to exert the function equivalent to the configuration of each device described above. In addition, there may also be provided a recording medium having the computer program recorded thereon. Furthermore, a sequence of processing can be implemented by hardware by configuring each functional block shown as the functional block diagram by hardware.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A signal processing system, the system comprising:
a plurality of display processors configured to respectively transmit image signals using multicast transmission;
a plurality of image receivers configured to respectively receive the image signals transmitted from the display processors according to the multicast transmission, each image signal corresponding to at least a portion of at least one display image, and to respectively process the image signals according to image control information to produce the at least one display image.

(2)

The signal processing system according to (1), wherein a first subset of the image receivers respectively receive and process the image signals for portions of a first display image, and a second subset of the image receivers respectively receive and process the image signals for portions of a second display image.

(3)

The signal processing system according to (2), wherein the first display image and the second display image are processed for display together on a display frame.

(4)

The signal processing system according to (2), wherein the first display image and the second display image are processed for display separately on respective display frames.

(5)

The signal processing system according to (1), wherein at least one of the display processors is configured to receive and transmit the image signals for respective display images to be displayed in respective display areas of a display device, and wherein the image control information is used to control whether the image signals for the respective display images will continue to be received depending upon a bandwidth condition.

(6)

The signal processing system according to (5), wherein said control comprises reserving bandwidth for a first image of the respective display images by discontinuing reception of a second image of the respective display images.

(7)

The signal processing system according to (6), wherein a determination to discontinue reception of the second image is made according to a predetermined rule.

(8)

The signal processing system according to (7), wherein the predetermined rule comprises determining which of the respective display images has not been displayed for a longest period of time.

(9)

The signal processing system according to (7), wherein the predetermined rule comprises priority information respectively assigned to the respective display images.

(10)

The signal processing system according to (1), wherein the display processors include a first display processor and a second display processor, wherein the first display processor is configured to transmit image signals for a first display image to at least one of the image receivers, and wherein transmission of the image signals for the first display image is diverted from the first display processor to the second display processor when a failure condition is detected for the first display processor.

(11)

The signal processing system according to (1), further comprising:
a controller configured to provide the image control information to at least one of the display processors or the image receivers, the image control information being used to determine which image receivers receive which of the image signals in the multicast transmission from the display processors.

(12)

The signal processing system according to (10), further comprising:
a controller configured to provide the image control information to at least one of the display processors or the image receivers, the image control information being used to determine which image receivers receive which of the image signals in the multicast transmission from the display processors, wherein the image control information comprises a control signal directed to the second display processor to engage in the transmission of image signals for the first display image when the failure condition is detected for the first display processor.

(13)

An image receiving system, the image receiving system comprising:
a plurality of image receivers configured to respectively receive image signals transmitted from at least one display processor according to a multicast transmission, each image signal corresponding to at least a portion of at least one display image, and to respectively process the image signals according to image control information to produce the at least one display image.

(14)

The image receiving system according to (13), wherein a first subset of the image receivers respectively receive and process the image signals for portions of a first display image, and a second subset of the image receivers respectively receive and process the image signals for portions of a second display image.

(15)

The image receiving system according to (14) wherein the first display image and the second display image are processed for display together on a display frame.

(16)

The image receiving system according to (14), wherein the first display image and the second display image are processed for display separately on respective display frames.

(17)

A display processor, the display processor comprising:
an output interface configured to transmit image signals using multicast transmission, the image signals corresponding to image receivers that are configured to respectively receive the image signals transmitted from the display processor according to the multicast transmission, each image signal corresponding to at least a portion of at least one display image, and that are configured to respectively process the image signals according to image control information to produce the at least one display image; and a control input configured to receive the image control information, the image control information being used to determine which image receivers receive which image signals in the multicast transmission from the display processor.

(18)

The display processor according to (17), wherein the display processor is configured to receive and transmit the image signals for respective display images to be displayed in respective display areas of a display device, and wherein the image control information is used to control whether the image signals for the respective display images will continue to be received depending upon a bandwidth condition.

(19)

The display processor according to (18), wherein said control comprises reserving bandwidth for a first image of the respective display images by discontinuing reception of a second image of the respective display images.

(20)

The display processor according to (19), wherein a determination to discontinue reception of the second image is made according to a predetermined rule.

(21)

The display processor according to (19), wherein the predetermined rule comprises determining which of the respective display images has not been displayed for a longest period of time.

(22)

The display processor according to (19), wherein the predetermined rule comprises priority information respectively assigned to the respective display images.

(23)

The display processor according to (17), wherein the display processor is one of a first display processor and a second display processor, wherein the first display processor is configured to transmit image signals for a first display image to at least one of the image receivers, and wherein transmission of the image signals for the first display image is diverted from the first display processor to the second display processor when a failure condition is detected for the first display processor.

(24)

An image signal transmitting method, the method comprising:
receiving image control information; and transmitting image signals using multicast transmission, wherein the image signals correspond to image receivers that are configured to respectively receive the image signals transmitted according to the multicast transmission, each image signal corresponding to at least a portion of at least one display image, and that are configured to respectively process the image signals according to the image control information to produce the at least one display image.

(25)

An image signal receiving method, the method comprising:
receiving image control information;
respectively receiving, by a plurality of image receivers, image signals transmitted from at least one display processor according to a multicast transmission, each image signal corresponding to at least a portion of at least one display image; and respectively processing the image signals according to image control information to produce the at least one display image.

(26)

A signal processing device including:
a control information acquiring unit configured to acquire image control information regarding control of an image;
an image receiver configured to selectively receive one or more images transmitted using multicast based on the image control information;
one or more image processing units configured to perform an image process on an image received by the image receiver based on the image control information; and
an image sender configured to transmit an image subjected to the image process by the image processing unit based on the image control information, the image being transmitted using multicast.

(27)

The signal processing device according to (26), wherein the image processing unit performs the image process on a portion of an area in which an image transmitted using multicast is displayed.

(28)

The signal processing device according to (26) or (27), wherein the image sender adjusts an output timing of the image based on the image control information.

(29)

The signal processing device according to any one of (26) to (28), wherein the image receiver continues to selectively receive an image transmitted from the image sender even when the image is no longer displayed in a transmission destination of the image sender.

(30)

The signal processing device according to (29), wherein the image receiver, when a bandwidth limitation is exceeded upon receiving an additional image transmitted using multicast, stops selectively receiving an image that has not been displayed for a longest period of time among images that are no longer displayed in a transmission destination of the image sender.

(31)

The signal processing device according to any one of (26) to (30), wherein a number of the image processing units equals to a number of images transmitted from the image sender.

(32)

The signal processing device according to any one of (26) to (31), wherein the image control information includes information on a transmission source of an image received selectively by the image receiver and a transmission destination of an image of the image sender.

(33)

The signal processing device according to any one of (26) to (32), wherein the image control information includes information regarding a location at which an image transmitted from the image sender is displayed.

(34)

The signal processing device according to (33), wherein the information regarding a location at which the image is displayed includes information regarding a position of the image transmitted from the image sender.

(35)

A signal processing method including:
a step of acquiring image control information regarding control of an image;
a selectively-receiving step of selectively receiving one or more images transmitted using multicast based on the image control information;
a performing-an-image-process step of performing an image process on the image received in the selectively-receiving step, based on the image control information; and
a step of transmitting the image subjected to the image process in the performing-an-image-process step, based on the image control information, the image being transmitted using multicast.

(36)

A computer program for causing a computer to execute:
a step of acquiring image control information regarding control of an image;
a selectively-receiving step of selectively receiving one or more images transmitted using multicast based on the image control information;
a performing-an-image-process step of performing an image process on the image received in the selectively-receiving step, based on the image control information; and
a step of transmitting the image subjected to the image process in the performing-an-image-process step, based on the image control information, the image being transmitted using multicast.

(37)

An image processing system including:
an image control device;
one or more image output devices;
one or more signal processing devices;
one or more image receiving devices; and
one or more image display devices,
wherein the signal processing device includes
a control information acquiring unit configured to acquire image control information regarding control of an image from the image control device,
an image receiver configured to selectively receive one or more images transmitted using multicast from the one or more image output devices based on the image control information,
one or more image processing units configured to perform an image process on an image received by the image receiver based on the image control information, the image process being for displaying the image on the one or more image display devices, and
an image sender configured to transmit an image subjected to the image process by the image processing unit based on the image control information to cause the image to be received by the one or more image receiving devices, the image being transmitted using multicast.

REFERENCE SIGNS LIST 1 image transmission system
10 layout controller
20 image sending terminal
30 image receiving terminal
40 image output terminal
45 image display system
50 image display device
100 display processor
102 control signal control unit
104 multicast reception control unit
106 image editing management unit
108 multicast transmission control unit
110 image receiver
112a-112d decoder
114a, 114b image editing processing unit
116a, 116b encoder
118 image sender

The invention claimed is:

1. A signal processing system, comprising:
a plurality of display processors, wherein a first display processor of the plurality of display processors is configured to:
  receive a first image signal from an image sending terminal;
  process the received first image signal to produce a second image signal,
  wherein the second image signal corresponds to a first display image to be displayed on an image display system, and
  wherein the received first image signal is processed based on image control information;
  transmit the second image signal based on a multicast transmission;
  control reception of the first image signal based on a duration of non-display of the first display image corresponding to the second image signal;
  receive a third image signal and a fourth image signal;
  determine discontinuation of reception of the fourth image signal based on non-display of a second display image, corresponding to the fourth image signal, for a specific period of time;
  control reception of the third image signal based on the discontinuation of the reception of the fourth image signal;
  receive a plurality of image signals corresponding to a plurality of display images to be displayed in a respective display area of the image display system, wherein
    the plurality of image signals is received based on the image control information,
    the plurality of image signals includes the first image signal, the third image signal and the fourth image signal, and the plurality of display images includes the first display image and the second display image; and
control reception of the plurality of image signals based on a network bandwidth,
wherein the first display processor is further configured to reserve the network bandwidth for the third image signal of the plurality of image signals based on the discontinuation of reception of the fourth image signal of the plurality of image signals, and
wherein the discontinuation of the reception of the fourth image signal is further based on non-display of the second display image corresponding to the fourth image signal for a longest period of time among the plurality of display images; and
a plurality of image receivers, wherein an image receiver of the plurality of image receivers is configured to receive the second image signal transmitted from the first display processor based on the multicast transmission.

2. The signal processing system according to claim 1, wherein
the first display processor of the plurality of display processors is further configured to receive and process the first image signal to produce a fifth image signal corresponding to a third display image to be displayed on the image display system, and
a second display processor of the plurality of display processors is configured to receive and process the first image signal to produce a sixth image signal corresponding to a fourth display image to be displayed on the image display system.

3. The signal processing system according to claim 2, wherein the first display processor and the second display processor are further configured to process the third display image and the fourth display image, respectively, for concurrent display on a display frame.

4. The signal processing system according to claim 2, wherein the first display processor and the second display processor are further configured to process the first display image and the second display image, respectively, for separate display on display frames.

5. The signal processing system according to claim 1, wherein the determination for the discontinuation of the fourth image signal is further based on priority information assigned to each of the plurality of image signals.

6. The signal processing system according to claim 1,
wherein the first display processor is further configured to transmit the second image signal corresponding to the first display image to the plurality of image receivers, and
wherein transmission of the second image signal corresponding to the first display image is diverted from the first display processor to a second display processor of the plurality of display processors based on detection of a failure condition for the first display processor.

7. The signal processing system according to claim 1, further comprising:
a controller configured to provide the image control information to at least one of the plurality of display processors and the plurality of image receivers,
wherein the plurality of image receivers is configured to determine which image signal in the multicast transmission from the plurality of display processors is received as the second image signal, and
wherein the determination is based on the image control information.

8. The signal processing system according to claim 1, further comprising:
a controller configured to provide the image control information to at least one of the plurality of display processors and the plurality of image receivers,
wherein
the plurality of image receivers is further configured to determine which image signal in the multicast transmission from the plurality of display processors is received as the second image signal,
the image control information comprises a control signal that controls a second display processor of the plurality of display processors to transmit the second image signal corresponding to the first display image, and
the second display processor is controlled to transmit the second image signal based on a detection of a failure condition for the first display processor of the plurality of display processors.

9. An image receiving system, comprising:
a plurality of display processors, wherein a first display processor of the plurality of display processors is configured to:
receive a first image signal from an image sending terminal;
process the received first image signal to produce a second image signal,
wherein the second image signal corresponds to a first display image to be displayed on an image display system, and
wherein the received first image signal is processed based on image control information; and
transmit the second image signal based on a multicast transmission; and
control reception of the first image signal based on a duration of non-display of the first display image corresponding to the second image signal;
receive a third image signal and a fourth image signal;
determine discontinuation of reception of the fourth image signal based on non-display of a second display image, corresponding to the fourth image signal, for a specific period of time;
control reception of the third image signal based on the discontinuation of the reception of the fourth image signal;
receive a plurality of image signals corresponding to a plurality of display images to be displayed in a respective display area of the image display system, wherein
the plurality of image signals is received based on the image control information,
the plurality of image signals includes the first image signal, the third image signal and the fourth image signal, and
the plurality of display images includes the first display image and the second display image; and
control reception of the plurality of image signals based on a network bandwidth,
wherein the first display processor is further configured to reserve the network bandwidth for the third image signal of the plurality of image signals based on the discontinuation of reception of the fourth image signal of the plurality of image signals, and
wherein the discontinuation of the reception of the fourth image signal is further based on non-display of the second display image corresponding to the fourth image signal for a longest period of time among the plurality of display images; and a plurality of image receivers, wherein an image receiver of the plurality of image receivers is configured to receive the second image signal transmitted from the display processor based on the multicast transmission.

10. The image receiving system according to claim 9, wherein the first display processor of the plurality of display processors is further configured to receive and process the first image signal to produce a fifth image signal corresponding to a third display image to be displayed on the image display system, and a second display processor of the plurality of display processors is configured to receive and process the first image signal to produce a sixth image signal corresponding to a fourth display image to be displayed on the image display system.

11. The image receiving system according to claim 10, wherein the first display processor and the second display processor are further configured to process the first display image and the second display image, respectively, for concurrent display on a display frame.

12. The image receiving system according to claim 10, wherein the first display processor and the second display processor are further configured to process the first display image and the second display image, respectively, for separate display on display frames.

13. A display processor, comprising:

an image receiver configured to receive a first image signal from an image sending terminal;

an output interface configured to transmit a second image signal to an image receiving terminal, wherein the second image signal is transmitted based on a multicast transmission, and wherein the second image signal corresponds to a first display image to be displayed on an image display system;

an image processing unit configured to process the received first image signal to produce the second image signal, wherein the received first image signal is processed based on image control information; and a control input configured to receive the image control information, wherein the image receiver is further configured to:

receive a third image signal and a fourth image signal;

determine which image signal in the multicast transmission is received by the image receiver, as the first image signal, based on the image control information;

determine discontinuation of reception of the fourth image signal based on non-display of a second display image, corresponding to the fourth image signal, for a specific period of time;

control reception of the first image signal based on a duration of non-display of the first display image corresponding to the second image signal;

control reception of the third image signal based on the discontinuation of the reception of the fourth image signal;

receive a plurality of image signals corresponding to a plurality of display images to be displayed in a respective display area of the image display system, wherein the plurality of image signals is received based on the image control information, the plurality of image signals includes the first image signal, the third image signal and the fourth image signal, and the plurality of display images includes the first display image and the second display image; and control reception of the plurality of image signals based on a network bandwidth, wherein the image receiver is further configured to reserve the network bandwidth for the third image signal of the plurality of image signals based on the discontinuation of reception of the fourth image signal of the plurality of image signals, and wherein the discontinuation of the fourth image signal is based on non-display of the fourth image signal for a longest period of time among the plurality of the image signals.

14. The display processor according to claim 13, wherein the determination for the discontinuation of the fourth image signal is further based on priority information assigned to each of the plurality of image signals.

15. The display processor according to claim 13, wherein the display processor comprises a first display processor and a second display processor, wherein the first display processor is further configured to transmit the second image signal corresponding to the first display image to the image receiving terminal, and wherein transmission of the second image signal corresponding to the first display image is diverted from the first display processor to the second display processor based on detection of a failure condition for the first display processor.

16. An image signal transmitting method, comprising:

receiving, by a display processor, a first image signal from an image sending terminal;

receiving, by the display processor, image control information from a controller;

processing, by the display processor, the received first image signal to produce a second image signal, wherein the second image signal corresponds to a first display image to be displayed on an image display system, and wherein the received first image signal is processed based on the received image control information;

transmitting, by the display processor, the second image signal to a plurality of image receivers based on a multicast transmission;

controlling, by the display processor, reception of the first image signal based on a duration of non-display of the first display image corresponding to the second image signal;

receiving, by the display processor, a third image signal and a fourth image signal;

determining, by the display processor, discontinuation of reception of the fourth image signal based on non-display of a second display image corresponding to the fourth image signal for a specific period of time; and controlling, by the display processor, reception of the third image signal based on the discontinuation of the reception of the fourth image signal;

receiving, by the display processor, a plurality of image signals corresponding to a plurality of display images to be displayed in a respective display area of the image display system, wherein the plurality of image signals is received based on the image control information, the plurality of image signals includes the first image signal, the third image signal and the fourth image signal, and the plurality of display images includes the first display image and the second display image; and controlling, by the display processor, reception of the plurality of image signals based on a network bandwidth, wherein the display processor is further configured to reserve the network bandwidth for the third image signal of the plurality of image signals based on the discontinuation of reception of the fourth image signal of the plurality of image signals, and wherein the discontinuation of the reception of the fourth image signal is further based on non-display of the second display image corresponding to the fourth image signal for a longest period of time among the plurality of display images.

17. An image signal receiving method, comprising:

receiving, by a display processor, image control information from a controller;

receiving, by the display processor, a first image signal from an image sending terminal;

processing, by the display processor, the received first image signal to produce a second image signal, wherein the second image signal corresponds to a first display image to be displayed on an image display system, and wherein the received first image signal is processed based on the received image control information;

transmitting, by the display processor, the second image signal based on a multicast transmission, wherein the second image signal is transmitted to an image receiving terminal;

controlling, by the display processor, reception of the first image signal based on a duration of non-display of the first display image corresponding to the second image signal;

receiving, by the display processor, a third image signal and a fourth image signal;

determining, by the display processor, discontinuation of reception of the fourth image signal based on non-display of a second display image, corresponding to the fourth image signal, for a specific period of time; and controlling, by the display processor, reception of the third image signal based on the discontinuation of the reception of the fourth image signal;

receiving, by the display processor, a plurality of image signals corresponding to a plurality of display images to be displayed in a respective display area of the image display system, wherein the plurality of image signals is received based on the image control information, the plurality of image signals includes the first image signal, the third image signal and the fourth image signal, and the plurality of display images includes the first display image and the second display image; and controlling, by the display processor, reception of the plurality of image signals based on a network bandwidth, wherein the display processor is further configured to reserve the network bandwidth for the third image signal of the plurality of image signals based on the discontinuation of reception of the fourth image signal of the plurality of image signals, and wherein the discontinuation of the reception of the fourth image signal is further based on non-display of the second display image corresponding to the fourth image signal for a longest period of time among the plurality of display images.

18. A signal processing device, comprising:

a control information acquiring unit configured to acquire image control information, wherein the image control information comprises information of control related to an image;

an image receiver configured to selectively receive a plurality of images, wherein the plurality of images is transmitted from an image sending terminal based on a multicast transmission, and wherein the plurality of images is selectively received based on the image control information;

a plurality of image processing units configured to process the selectively received the plurality of images based on the image control information, wherein the processed plurality of images corresponds to a display image to be displayed on an image display system; and an image sender configured to transmit the processed plurality of images based on the image control information, wherein the processed plurality of images is transmitted based on the multicast transmission, the image receiver is further configured to:

control reception of the plurality of images based on a duration of non-display of the display image corresponding to the processed plurality of images;

continue to selectively receive the plurality of images from the image sending terminal when the plurality of images are no longer displayed in the image display system, stop selective reception of a first image of the plurality of images based on a network bandwidth limitation that exceeds upon receipt of a second image, of the plurality of images, transmitted based on the multicast transmission, and display of the first image is stopped for a longest period among the plurality of images that are no longer displayed.

19. The signal processing device according to claim 18, wherein the plurality of image processing units is further configured to process the plurality of images based on a respective area of the image display system in which the processed plurality of images is displayed.

20. The signal processing device according to claim 18, wherein the image sender is further configured to adjust a timing of the transmission of the processed plurality of images, and wherein the timing is adjusted based on the image control information.

21. The signal processing device according to claim 18, wherein a number of the plurality of image processing units is equal to a number of the plurality of images transmitted from the image sending terminal.

22. The signal processing device according to claim 18, wherein the image control information further includes information on a transmission source of the plurality of images received selectively by the image receiver and a transmission destination of the processed plurality of images transmitted by the image sender.

23. The signal processing device according to claim 18, wherein the image control information further includes information of locations at which the processed plurality of images transmitted from the image sender is to be displayed.

24. The signal processing device according to claim 23, wherein the information of the locations at which the processed plurality of images is to be displayed includes information of a display position of the processed plurality of images on the image display system.

25. A signal processing method, comprising:
   acquiring image control information,
      wherein the image control information comprises information of control related to an image;
   selectively receiving a plurality of images,
      wherein the plurality of images is transmitted from an image sending terminal based on a multicast transmission, and
      wherein the plurality of images is selectively received based on the image control information;
   processing the selectively received plurality of images based on the image control information,
      wherein the processed plurality of images corresponds to a display image to be displayed on an image display system;
   transmitting the processed plurality of images based on the image control information,
      wherein the processed plurality of images is transmitted based on the multicast transmission; and
   controlling reception of the plurality of images based on a duration of non-display of the display image corresponding to the processed plurality of images, wherein
      the plurality of images is continued to be selectively received from the image sending terminal when the plurality of images is no longer displayed in the image display system,
      selective reception of a first image of the plurality of images is stopped based on a network bandwidth limitation that exceeds upon receipt of a second image, of the plurality of images, transmitted based on the multicast transmission, and
      display of the first image is stopped for a longest period among the plurality of images that are no longer displayed.

26. A non-transitory computer-readable medium having stored thereon, computer-executable instructions which, when executed by a computer, cause the computer to execute operations, the operations comprising:
   acquiring image control information,
      wherein the image control information comprises information of control related to an image;
   selectively receiving a plurality of images,
      wherein the plurality of images is transmitted from an image sending terminal based on a multicast transmission, and
      wherein the plurality of images is selectively received based on the image control information;
   processing the selectively received plurality of images based on the image control information,
      wherein the processed plurality of images corresponds to a display image to be displayed on an image display system;
   transmitting the processed plurality of images based on the image control information,
      wherein the processed plurality of images is transmitted based on the multicast transmission; and
   controlling reception of the plurality of images based on a duration of non-display of the display image corresponding to the processed plurality of images, wherein
      the plurality of images is continued to be selectively received from the image sending terminal when the plurality of images is no longer displayed in the image display system,
      selective reception of a first image of the plurality of images is stopped based on a network bandwidth limitation that exceeds upon receipt of a second image, of the plurality of images, transmitted based on the multicast transmission, and
      display of the first image is stopped for a longest period among the plurality of images that is no longer displayed.

27. An image processing system, comprising:
   an image control device configured to transmit image control information related to control of an image;
   a plurality of image output devices configured to transmit a plurality of image based on a multicast transmission;
   a plurality of signal processing devices,
   wherein each of the plurality of signal processing devices comprises:
      a control information acquiring unit configured to acquire the image control information transmitted from the image control device;
      an image receiver configured to selectively receive the plurality of images transmitted from the plurality of image output devices based on the multicast transmission,
         wherein the plurality of images is selectively received based on the image control information;
      a plurality of image processing units configured to process the selectively received plurality of images based on the image control information,
         wherein the processed plurality of images corresponds to a display image to be displayed; and
      an image sender configured to transmit the processed plurality of images based on the image control information, wherein
         the processed plurality of images is transmitted based on the multicast transmission,
         the image receiver is further configured to:
            control reception of the plurality of images based on a duration of non-display of the display image corresponding to the processed plurality of images;
            continue to selectively receive the plurality of images from the image sending terminal when the plurality of images is no longer displayed,
            stop selective reception of a first image of the plurality of images based on a network bandwidth limitation that exceeds upon receipt of a second image, of the plurality of images, transmitted based on the multicast transmission, and
            display of the first image is stopped for a longest period among the plurality of images that is no longer displayed;
   a plurality of image receiving devices configured to:
      receive the processed plurality of images transmitted from the image sender; and
      transmit the processed plurality of images received from the image sender; and a plurality of image display devices configured to:
  receive the processed plurality of images transmitted from the plurality of image receiving devices; and
  display the processed plurality of images.

\* \* \* \* \*